(12) United States Patent
Hampel et al.

(10) Patent No.: US 11,337,120 B2
(45) Date of Patent: May 17, 2022

(54) BEAM-AWARE HANDOVER PROCEDURE FOR MULTI-BEAM ACCESS SYSTEMS

(71) Applicant: QUALCOMM Incorporated, San Diego, CA (US)

(72) Inventors: Karl Georg Hampel, Hoboken, NJ (US); Sumeeth Nagaraja, San Diego, CA (US); Ravi Agarwal, San Diego, CA (US); Bilal Sadiq, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/926,436

(22) Filed: Mar. 20, 2018

(65) Prior Publication Data

US 2018/0279181 A1    Sep. 27, 2018

Related U.S. Application Data

(60) Provisional application No. 62/476,126, filed on Mar. 24, 2017.

(51) Int. Cl.
*H04W 36/00* (2009.01)
*H04W 72/04* (2009.01)
(Continued)

(52) U.S. Cl.
CPC ...... *H04W 36/0033* (2013.01); *H04B 7/0617* (2013.01); *H04W 36/0072* (2013.01);
(Continued)

(58) Field of Classification Search
None
See application file for complete search history.

(56) References Cited

U.S. PATENT DOCUMENTS 8,614,990 B1 * 12/2013 Mistry ............ H04W 36/00837
370/332
9,155,014 B2   10/2015 Tenny et al.
(Continued)

FOREIGN PATENT DOCUMENTS

CN    101938799 A    1/2011
CN    102984769 A    3/2013
(Continued)

OTHER PUBLICATIONS

Ericsson: "Inter-Cell Handover in NR", 3GPP Draft; R2-168730 Inter-Cell Handover in NR, 3rd Generation Partnership Project (3GPP), Mobile Competence Centre; 650, Route Des Lucioles; F-06921 Sophia-Antipolis Cedex; France, vol. RAN WG2, No. Reno. Nevada, USA; Nov. 14, 2016-Nov. 18, 2016 Nov. 13, 2016, XP051178279, Retrieved from the Internet: URL:http://www.3gpp.org/ftp/Meetings_3GPP_SYNC/RAN2/Docs/ [retrieved on Nov. 13, 2016], 7 pages.
(Continued)

*Primary Examiner* — Shirpal K Khajuria
(74) *Attorney, Agent, or Firm* — Holland & Hart LLP

(57) ABSTRACT

Methods, systems, and devices for wireless communication are described for a beam-aware handover procedure for multi-beam access systems. A source base station may determine that a handover request is to be sent to a target base station in preparation for handover of a user equipment (UE) from the source base station to the target base station, and transmit the handover request to the target base station with an indication of whether the handover is to be delayed. Alternatively or in addition to, either the target base station or the source base station may generate and transmit a time expiration indicator. The indication of whether the handover is to be delayed or the time expiration indicator may allow
(Continued)

either the target base station or the UE to determine whether access parameters for the UE are valid.

60 Claims, 21 Drawing Sheets

(51) Int. Cl.
H04B 7/06 (2006.01)
H04W 36/06 (2009.01)
H04W 36/36 (2009.01)
H04W 16/28 (2009.01)
H04W 36/30 (2009.01)

(52) U.S. Cl.
CPC ........... H04W 36/06 (2013.01); H04W 36/36 (2013.01); H04W 72/046 (2013.01); H04B 7/0695 (2013.01); H04W 16/28 (2013.01); H04W 36/0077 (2013.01); H04W 36/30 (2013.01)

(56) References Cited

U.S. PATENT DOCUMENTS

| | | | |
|---|---|---|---|
| 9,608,689 B2 | 3/2017 | Dayal et al. | |
| 2010/0330993 A1* | 12/2010 | Kone | H04W 36/0079 455/436 |
| 2011/0281581 A1 | 11/2011 | Brandt et al. | |
| 2012/0021747 A1* | 1/2012 | Brandt | H04W 36/0055 455/437 |
| 2015/0163709 A1* | 6/2015 | Lee | H04L 65/80 370/332 |
| 2015/0230135 A1 | 8/2015 | Yang | |
| 2017/0230104 A1* | 8/2017 | Purkayastha | H04W 48/20 |
| 2017/0257780 A1* | 9/2017 | Ryoo | H04W 36/28 |

FOREIGN PATENT DOCUMENTS

| | | |
|---|---|---|
| EP | 1978774 A2 | 10/2008 |
| EP | 2696624 A1 | 2/2014 |
| EP | 3029986 A1 | 6/2016 |
| TW | 201320799 A | 5/2013 |
| WO | WO-2010057127 | 5/2010 |
| WO | WO-2014186204 | 11/2014 |
| WO | WO-2015120396 | 8/2015 |
| WO | WO-2016043502 A1 | 3/2016 |

OTHER PUBLICATIONS

International Search Report and Written Opinion—PCT/US2018/023592—ISA/EPO—dated Jul. 4, 2018.
Taiwan Search Report—TW107109617—TIPO—dated Jul. 28, 2021.
Huawei: "UE Context Release in Source HeNB GW after X2 Handover from HeNBto eNB", 3GPP TSG-RAN WG3 Meeting #77bis, R3-122388, Lecce, Italy, Oct. 8-12, 2012, https://www.3gpp.org/ftp/tsg_ran/WG3_lu/TSGR3_77bis/Docs/R3-122388.zip, 5 Pages.
Yin C., et al., "Handoff Strategy of Spectrum Aggregation in Cognitive Radio ", Journal of Sichuan University (Engineering Science Edition), vol. 45 No. 6, Nov. 20, 2013, Article No. 1009-3087 (2013) 06-0116-07, 11 Pages.

* cited by examiner

BEAM-AWARE HANDOVER PROCEDURE FOR MULTI-BEAM ACCESS SYSTEMS

CROSS REFERENCES

The present Application for Patent claims priority to U.S. Provisional Patent Application No. 62/476,126 by Hampel, et al., entitled "Beam-Aware Handover Procedure For Multi-Beam Access Systems," filed Mar. 24, 2017, assigned to the assignee hereof.

BACKGROUND

The following relates generally to wireless communication, and more specifically to a beam-aware handover procedure for multi-beam access systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems have expanded the use of millimeter wave (mmW) frequencies. In some instances, mmW transmissions have a larger path loss and can be blocked by buildings, trees, or the like. Because of these and other issues, beamforming is a technique used to improve a signal to interference plus noise ratio (SINR) for mmW transmissions. To beamform, a transmitter uses an array of antennas to focus a radiated electromagnetic signal in the direction of a receiver. Conventional handover techniques, however, may be deficient when performing a handover of a connection established using mmW transmissions.

SUMMARY

The described techniques relate to improved methods, systems, devices, or apparatuses that support a beam-aware handover procedure for multi-beam access systems. A source base station may preemptively prepare a target base station for handover of a UE communicating using a directional mmW beam that accounts for delay of handover execution. Under the described techniques, the source base station may coordinate the handover execution so as to reduce handover failure which may occur as a result of the UE or the target base station operating using outdated information due to handover delay. The examples described herein may address these and other issues by having a source base station provide an indication of whether a handover is being delayed. The target base station may determine whether to allocate one or more beams for the handover based on the indication. If one or more beams are allocated, the target base station may select one or more access parameters that the UE may use to establish access to the target base station during a handover.

A method for wireless communication by a source base station is described. The method may include determining that a handover request is to be sent to a target base station in preparation for handover of a UE from the source base station to the target base station and transmitting the handover request to the target base station with an indication of whether the handover is to be delayed.

An apparatus for wireless communication by a source base station is described. The apparatus may include means for determining that a handover request is to be sent to a target base station in preparation for handover of a UE from the source base station to the target base station and means for transmitting the handover request to the target base station with an indication of whether the handover is to be delayed.

Another apparatus for wireless communication by a source base station is described. The apparatus may include a processor, memory in electronic communication with the processor, and instructions stored in the memory. The instructions may be operable to cause the processor to determine that a handover request is to be sent to a target base station in preparation for handover of a UE from the source base station to the target base station and transmit the handover request to the target base station with an indication of whether the handover is to be delayed.

A non-transitory computer readable medium for wireless communication by a source base station is described. The non-transitory computer-readable medium may include instructions operable to cause a processor to determine that a handover request is to be sent to a target base station in preparation for handover of a UE from the source base station to the target base station and transmit the handover request to the target base station with an indication of whether the handover is to be delayed.

Some examples of the method, apparatus, and non-transitory computer-readable medium described above may further include processes, features, means, or instructions for determining that the handover may be to be delayed for a threshold duration of time, where the indication may be based at least in part on the determination of the delay.

Some examples of the method, apparatus, and non-transitory computer-readable medium described above may further include processes, features, means, or instructions for receiving, from the UE, a measurement report that includes one or more beam identifiers of beams associated with the target base station, where the handover request may include the one or more beam identifiers.

In some examples of the method, apparatus, and non-transitory computer-readable medium described above, the measurement report may include beam measurements corresponding to the one or more beam identifiers.

In some examples of the method, apparatus, and non-transitory computer-readable medium described above, the indication may be a binary flag that indicates the handover may be one of a non-delayed handover and a delayed handover.

Some examples of the method, apparatus, and non-transitory computer-readable medium described above may further include processes, features, means, or instructions for estimating an amount of time to delay the handover, where the estimate of the amount of time may be included in the indication.

Some examples of the method, apparatus, and non-transitory computer-readable medium described above may further include processes, features, means, or instructions for transmitting a measurement configuration that instructs the UE to measure a plurality of different beams.

Some examples of the method, apparatus, and non-transitory computer-readable medium described above may further include processes, features, means, or instructions for receiving, from the target base station, a handover request acknowledgement that includes an access parameter. Some examples of the method, apparatus, and non-transitory computer-readable medium described above may further include processes, features, means, or instructions for transmitting, to the UE, a handover command that includes the access parameter to initiate execution of the handover of the UE from the source base station to the target base station.

In some examples of the method, apparatus, and non-transitory computer-readable medium described above, transmitting the handover command may further include: delaying transmission of the handover command.

In some examples of the method, apparatus, and non-transitory computer-readable medium described above, the handover request acknowledgement may include a time stamp associated with a time when the access parameter expires.

In some examples of the method, apparatus, and non-transitory computer-readable medium described above, the handover request acknowledgement may include a second access parameter, where the access parameter may be associated with a first time interval and the second access parameter may be associated with a second time interval.

A method of for wireless communication by a target base station is described. The method may include receiving, from a source base station, a handover request in preparation for handover of a UE from the source base station to the target base station, the handover request including an indication of whether the handover is to be delayed and transmitting a handover request acknowledgment in response to the handover request.

An apparatus for wireless communication by a target base station is described. The apparatus may include means for receiving, from a source base station, a handover request in preparation for handover of a UE from the source base station to the target base station, the handover request including an indication of whether the handover is to be delayed and means for transmitting a handover request acknowledgment in response to the handover request.

Another apparatus for wireless communication by a target base station is described. The apparatus may include a processor, memory in electronic communication with the processor, and instructions stored in the memory. The instructions may be operable to cause the processor to receive, from a source base station, a handover request in preparation for handover of a UE from the source base station to the target base station, the handover request including an indication of whether the handover is to be delayed and transmit a handover request acknowledgment in response to the handover request.

A non-transitory computer readable medium for wireless communication by a target base station is described. The non-transitory computer-readable medium may include instructions operable to cause a processor to receive, from a source base station, a handover request in preparation for handover of a UE from the source base station to the target base station, the handover request including an indication of whether the handover is to be delayed and transmit a handover request acknowledgment in response to the handover request.

Some examples of the method, apparatus, and non-transitory computer-readable medium described above may further include processes, features, means, or instructions for determining an allocation status for a beam that indicates whether the beam may be being allocated for the handover based at least in part on the indication.

In some examples of the method, apparatus, and non-transitory computer-readable medium described above, determining the allocation status may include: determining to allocate the beam for the handover, where the handover request acknowledgment may include a beam identifier of the beam.

In some examples of the method, apparatus, and non-transitory computer-readable medium described above, determining the allocation status may include: determining to allocate the beam for the handover. Some examples of the method, apparatus, and non-transitory computer-readable medium described above may further include processes, features, means, or instructions for selecting an access parameter associated with the beam, where the handover request acknowledgment may include the access parameter.

Some examples of the method, apparatus, and non-transitory computer-readable medium described above may further include processes, features, means, or instructions for generating a time stamp associated with an expiration time of the access parameter, where the handover request acknowledgement may include the time stamp.

In some examples of the method, apparatus, and non-transitory computer-readable medium described above, determining the allocation status may include: determining to allocate a second beam for the handover. Some examples of the method, apparatus, and non-transitory computer-readable medium described above may further include processes, features, means, or instructions for selecting a second access parameter associated with the second beam, where the access parameter may be associated with a first time interval and the second access parameter may be associated with a second time interval, and the handover request acknowledgement may include the second access parameter.

In some examples of the method, apparatus, and non-transitory computer-readable medium described above, the indication may be a binary flag that indicates the handover may be one of a non-delayed handover and a delayed handover.

In some examples of the method, apparatus, and non-transitory computer-readable medium described above, the handover request may include one or more beam identifiers of beams associated with the target base station.

In some examples of the method, apparatus, and non-transitory computer-readable medium described above, the handover request may include beam measurements corresponding to the one or more beam identifiers.

In some examples of the method, apparatus, and non-transitory computer-readable medium described above, the handover request acknowledgment may include the one or more beam identifiers.

A method for wireless communication by a target base station is described. The method may include receiving, from a source base station, a handover request in preparation for handover of a UE from the source base station to the target base station, selecting an access parameter of a beam being allocated for the handover and a time expiration indicator associated with the access parameter, and transmitting, to the source base station, a handover request acknowledgment that includes the access parameter and the time expiration indicator.

An apparatus for wireless communication by a target base station is described. The apparatus may include means for receiving, from a source base station, a handover request in preparation for handover of a UE from the source base station to the target base station, means for selecting an access parameter of a beam being allocated for the handover and a time expiration indicator associated with the access parameter, and means for transmitting, to the source base station, a handover request acknowledgment that includes the access parameter and the time expiration indicator.

Another apparatus for wireless communication by a target base station is described. The apparatus may include a processor, memory in electronic communication with the processor, and instructions stored in the memory. The instructions may be operable to cause the processor to receive, from a source base station, a handover request in preparation for handover of a UE from the source base station to the target base station, select an access parameter of a beam being allocated for the handover and a time expiration indicator associated with the access parameter, and transmit, to the source base station, a handover request acknowledgment that includes the access parameter and the time expiration indicator.

A non-transitory computer readable medium for wireless communication by a target base station is described. The non-transitory computer-readable medium may include instructions operable to cause a processor to receive, from a source base station, a handover request in preparation for handover of a UE from the source base station to the target base station, select an access parameter of a beam being allocated for the handover and a time expiration indicator associated with the access parameter, and transmit, to the source base station, a handover request acknowledgment that includes the access parameter and the time expiration indicator.

Some examples of the method, apparatus, and non-transitory computer-readable medium described above may further include processes, features, means, or instructions for setting an expiration time for the access parameter based at least in part on a time indicated in the time stamp.

In some examples of the method, apparatus, and non-transitory computer-readable medium described above, the time expiration indicator may be a maximum attempt number, indicating a maximum number of attempts to be made by the UE for handover using the access parameter.

Some examples of the method, apparatus, and non-transitory computer-readable medium described above may further include processes, features, means, or instructions for determining to allocate a second beam for the handover. Some examples of the method, apparatus, and non-transitory computer-readable medium described above may further include processes, features, means, or instructions for selecting a second access parameter associated with the second beam, where the access parameter may be associated with a first time interval and the second access parameter may be associated with a second time interval, and the handover request acknowledgement may include the second access parameter.

In some examples of the method, apparatus, and non-transitory computer-readable medium described above, the second access parameter may be a dedicated preamble for contention-free access.

In some examples of the method, apparatus, and non-transitory computer-readable medium described above, the handover request may include one or more beam identifiers of beams associated with the target base station.

In some examples of the method, apparatus, and non-transitory computer-readable medium described above, the handover request may include beam measurements corresponding to the one or more beam identifiers.

In some examples of the method, apparatus, and non-transitory computer-readable medium described above, the handover request acknowledgment may include the one or more beam identifiers.

A method of for wireless communication by a source base station is described. The method may include receiving, from a target base station, a first message including an access parameter of a beam allocated for a handover of a UE from the source base station to the target base station, generating a time expiration indicator associated with the access parameter, and transmitting, to the UE, a second message that includes the access parameter and the time expiration indicator.

An apparatus for wireless communication by a source base station is described. The apparatus may include means for receiving, from a target base station, a first message comprising an access parameter of a beam allocated for a handover of a UE from the source base station to the target base station, means for generating a time expiration indicator associated with the access parameter, and means for transmitting, to the UE, a second message that includes the access parameter and the time expiration indicator.

An apparatus for wireless communication by a source base station is described. The apparatus may include a processor, memory in electronic communication with the processor, and instructions stored in the memory. The instructions may be operable to cause the processor to receive, from a target base station, a first message including an access parameter of a beam allocated for a handover of a UE from the source base station to the target base station, generate a time expiration indicator associated with the access parameter, and transmit, to the UE, a second message that includes the access parameter and the time expiration indicator.

A non-transitory computer readable medium for wireless communication by a source base station is described. The non-transitory computer-readable medium may include instructions operable to cause a processor to receive, from a target base station, a first message including an access parameter of a beam allocated for a handover of a UE from the source base station to the target base station, generate a time expiration indicator associated with the access parameter, and transmit, to the UE, a second message that includes the access parameter and the time expiration indicator.

In some examples of the method, apparatus, and non-transitory computer-readable medium described above, the time expiration indicator may indicate an age of the access parameter.

In some examples of the method, apparatus, and non-transitory computer-readable medium described above, the time expiration indicator may be a binary flag that indicates whether the access parameter may be outdated.

In some examples of the method, apparatus, and non-transitory computer-readable medium described above, the time expiration indicator may be a time value that indicates a time of receipt of the access parameter by the source base station from the target base station.

A method for wireless communication by a UE is described. The method may include receiving an access parameter associated with a target base station and a time expiration indicator associated with the access parameter, processing the time expiration indicator to determine an expiration status of the access parameter, and performing a handover from a source base station to the target base station based at least in part on the expiration status of the access parameter.

An apparatus for wireless communication by a UE is described. The apparatus may include means for receiving an access parameter associated with a target base station and a time expiration indicator associated with the access parameter, means for processing the time expiration indicator to determine an expiration status of the access parameter, and means for performing a handover from a source base station to the target base station based at least in part on the expiration status of the access parameter.

Another apparatus for wireless communication by a UE is described. The apparatus may include a processor, memory in electronic communication with the processor, and instructions stored in the memory. The instructions may be operable to cause the processor to receive an access parameter associated with a target base station and a time expiration indicator associated with the access parameter, process the time expiration indicator to determine an expiration status of the access parameter, and perform a handover from a source base station to the target base station based at least in part on the expiration status of the access parameter.

A non-transitory computer readable medium for wireless communication by a UE is described. The non-transitory computer-readable medium may include instructions operable to cause a processor to receive an access parameter associated with a target base station and a time expiration indicator associated with the access parameter, process the time expiration indicator to determine an expiration status of the access parameter, and perform a handover from a source base station to the target base station based at least in part on the expiration status of the access parameter.

In some examples of the method, apparatus, and non-transitory computer-readable medium described above, the time expiration indicator may be a time stamp.

Some examples of the method, apparatus, and non-transitory computer-readable medium described above may further include processes, features, means, or instructions for deriving a time of expiration of the access parameter from the time stamp.

In some examples of the method, apparatus, and non-transitory computer-readable medium described above, the time expiration indicator may be a maximum attempt number, indicating a maximum number of attempts to be made by the UE for handover using the access parameter.

In some examples of the method, apparatus, and non-transitory computer-readable medium described above, the expiration status may indicate that the access parameter may be expired, and performing the handover may include obtaining a second access parameter from the target base station and performing an access procedure using the second access parameter to establish a connection with the target base station.

In some examples of the method, apparatus, and non-transitory computer-readable medium described above, the second access parameter may be a dedicated preamble for contention-free access.

Some examples of the method, apparatus, and non-transitory computer-readable medium described above may further include processes, features, means, or instructions for identifying a transmission beam to use based on receipt of a downlink reference signal. Some examples of the method, apparatus, and non-transitory computer-readable medium described above may further include processes, features, means, or instructions for transmitting a random access channel (RACH) message to the target base station using the transmission beam and the dedicated preamble.

In some examples of the method, apparatus, and non-transitory computer-readable medium described above, the expiration status may indicate that the access parameter may be not expired, and performing the handover may include performing an access procedure using the access parameter to establish a connection with the target base station.

Some examples of the method, apparatus, and non-transitory computer-readable medium described above may further include processes, features, means, or instructions for receiving a second access parameter associated with the target base station, where the access parameter may be associated with a first time interval and the second access parameter may be associated with a second time interval.

In some examples of the method, apparatus, and non-transitory computer-readable medium described above, the expiration status may indicate that the access parameter may be expired, and performing the handover may include performing an access procedure using the second access parameter to establish a connection with the target base station.

In some examples of the method, apparatus, and non-transitory computer-readable medium described above, the time expiration indicator may indicate an age of the access parameter. In some examples of the method, apparatus, and non-transitory computer-readable medium described above, the time expiration indicator may be a binary flag that indicates whether the access parameter may be outdated. In some examples of the method, apparatus, and non-transitory computer-readable medium described above, the time expiration indicator may be a time value that indicates a time of receipt of the access parameter by the source base station from the target base station.

DETAILED DESCRIPTION

Figure 1:
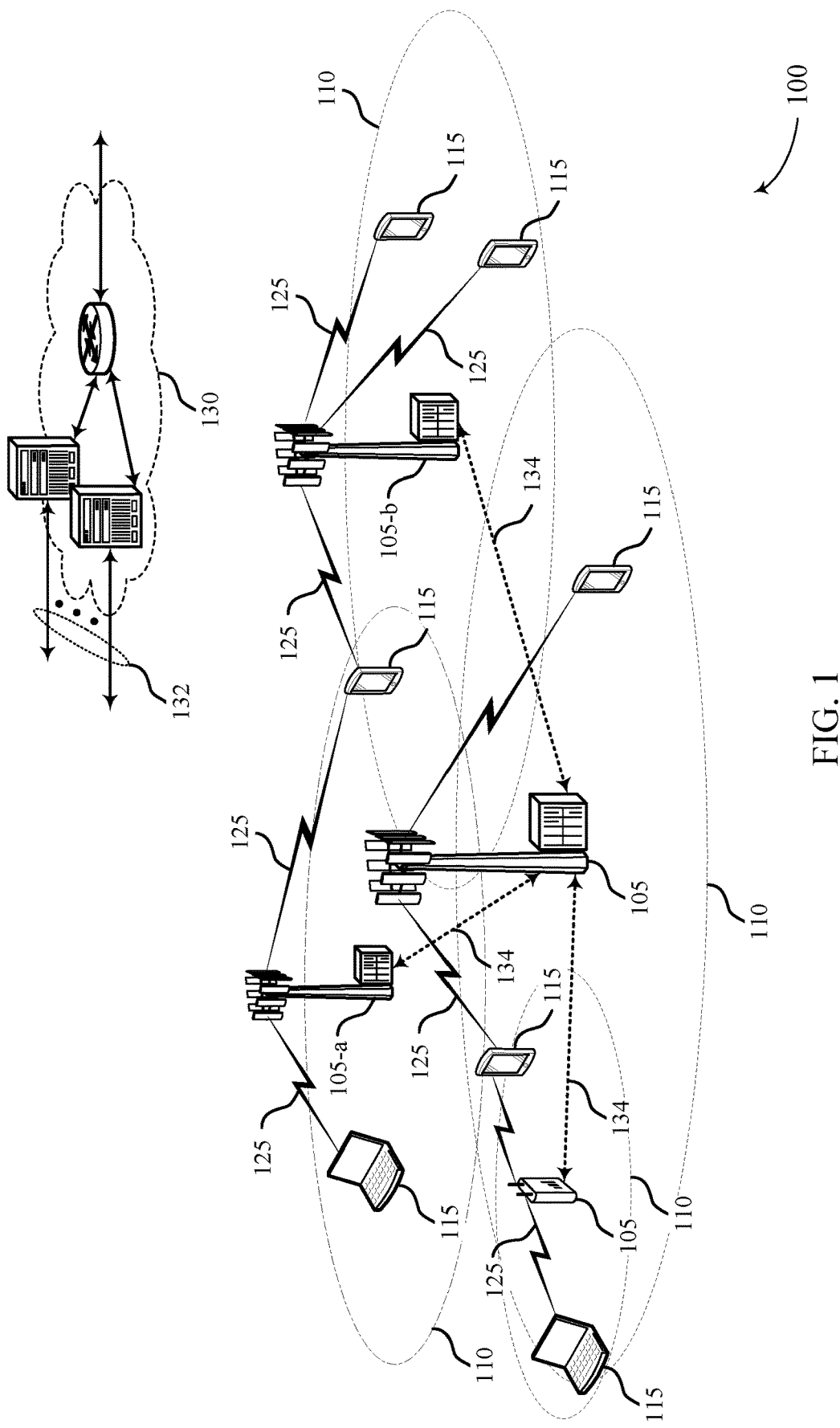
FIG. 1 illustrates an example of a system for wireless communication that supports a beam-aware handover procedure for multi-beam access systems in accordance with aspects of the present disclosure.

Techniques are disclosed that support a beam-aware handover procedure for multi-beam access systems. A source base station may preemptively prepare a target base station for a handover of a UE communicating using directional mmW beams that accounts for delay of handover execution. The techniques generally provide for the source base station to coordinate handling of delayed handover to reduce handover failure. In delayed handover, access information provided by the target base station may become outdated by the time the handover is executed. This may lead to handover failure since the UE may try to access the target base station on a beam using the outdated access information. Under the described techniques, the source base station may coordinate the handover execution so as to reduce handover failure which may occur as a result of the UE or the target base station operating on outdated information as a result of the delay.

In some techniques, a user equipment (UE) may establish a connection with a new radio (NR) source base station and communicate with the source base station using a directional millimeter wave (mmW) beam. At some time, the source base station may determine to perform a handover of the UE to a NR target base station. The UE may facilitate selection of which beam to use for handover by reporting beam measurements to the source base station. To prepare for handover, a target base station may select one or more beams and may provide access information to the UE via the source base station. The access information may be specific to each of the selected beams which the UE may use in a random access procedure to connect to the target cell during the handover.

The UE may initiate the random access procedure by transmitting a random-access preamble on one or more of the beams selected by the target base station. The target base station beneficially does not have to perform a full beam sweep to detect on which beam the UE transmitted the random-access preamble, and instead may solely listen to those beams specified to the UE. The target base station also advantageously may allocate resources that the UE may use for access that may speed up the handover.

To reduce the likelihood of handover failure occurring due to the handover being delayed, a source base station may provide an indication to a target base station of whether a handover is to be delayed. In some examples, the source base station may include the indication in a handover request transmitted to the target base station. The target base station may receive the handover request, determine whether to allocate one or more beams for the handover based on the indication, and transmit a handover request acknowledgment in response to the handover request. The handover request acknowledgment may or may not include one or more access parameters of one or more beams allocated for the handover. If included, the user equipment may use the one or more access parameters in an access procedure to establish a connection with the target base station during the handover.

In some examples, either a target base station or a source base station may provide an indication to a UE that allows the UE to determine whether the one or more access parameters received from the target base station are valid or usable, even if a delay has occurred between a handover preparation and a handover execution. If invalid or not useable, the UE may request new access parameters instead of attempting to execute a handover using parameters that are stale, thereby reducing the likelihood of handover failure.

Aspects of the disclosure are initially described in the context of a wireless communications system. Techniques are described to enable a source base station to preemptively prepare a target base station for a handover that accounts for a handover delay. Aspects of the disclosure are further illustrated by and described with reference to apparatus diagrams, system diagrams, and flowcharts that relate to a beam-aware handover procedure for multi-beam access systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

A UE 115 may establish a connection with a source base station 105-*a*, and at some time, the source base station 105 may determine whether to handover the UE 115 to a target base station 105. To avoid or reduce handover failures, the source base station 105 may include an indication in a handover request that indicates whether a handover is to be delayed. The target base station 105 may receive the handover request, determine whether to allocate one or more beams for the handover based on the indication, and transmit a handover request acknowledgment in response to the handover request. The handover request acknowledgment may or may not include one or more access parameters of one or more beams to be used by a UE 115 in an access procedure. In other examples, either a target base station 105 or a source base station 105 may provide an indication to a UE 115 that allows the UE 115 to determine whether the one or more access parameters received from the target base station 105 are valid or usable, even if a delay has occurred between a handover preparation and a handover execution.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, transaction-based business charging, or the like.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system 100 may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide an IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the UHF waves may penetrate walls sufficiently to provide service to UEs 115 located indoors. Transmission of the UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even a greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both the transmitter and the receiver are equipped with multiple antennas. Some portions of wireless communications system 100 may use beamforming. For example, base station 105 may have an antenna array with a number of rows and columns of antenna ports that the base station 105 may use for beamforming in its communication with a UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, a network device, or a core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (e.g., the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

The examples described herein may address issues with handover failure by having a source base station provide an indication to a target base station of whether a requested handover is to be delayed. A target base station may process the indication to determine whether to allocate a beam to be used by the UE for the handover. Alternatively, or in combination with the provision of the indication by the source base station, either the target base station or the source base station may provide a further indication (for example, in the form of a time expiration indicator) to the UE so that the UE may determine whether access parameters provided by the target base station are valid.

Figure 2:
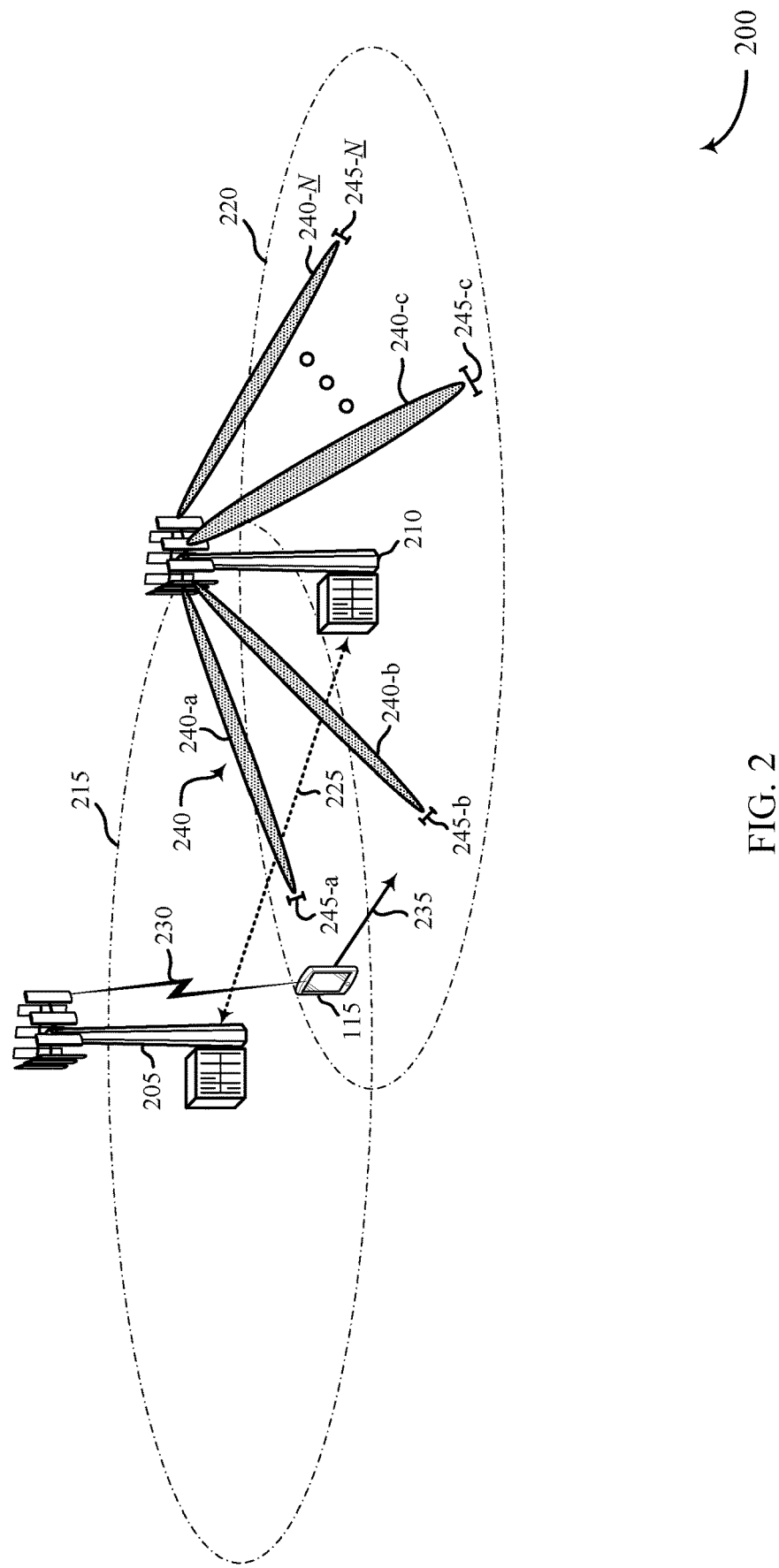
FIG. 2 illustrates an example of a wireless communication system that supports a beam-aware handover procedure for multi-beam access systems in accordance with aspects of the present disclosure.

FIG. 2 illustrates an example of a wireless communication system 200 that supports a beam-aware handover procedure for multi-beam access systems in accordance with various aspects of the present disclosure. The wireless communication system 200 may be an example of the wireless communication system 100 discussed with reference to FIG. 1. The wireless communication system 200 includes a source base station 205 and a target base station 210. Coverage areas 215, 220 may be defined for their respective base stations 205, 210. The source base station 205 and the target base station 210 may be examples of the base stations 105 described with reference to FIG. 1. As such, features of the base stations 205, 210 may be similar to those of the base stations 105.

The source base station 205 and the target base station 210 may communicate via a backhaul link 225. The backhaul link 225 may be a wired backhaul link or a wireless backhaul link. The backhaul link 225 may be configured to communicate data and other information between the source base station 205 and the target base station 210. The backhaul link 225 may be an example of the backhaul links 134 described in reference to FIG. 1.

The source base station 205 may establish a communication link 230 with a UE 115. The communication link 230 may be an example of the communication links 125 described with reference to FIG. 1. One characteristic of UEs 115 in a wireless communication system 200 is that the UEs 115 may be mobile. Because UEs 115 may change their geophysical location in the wireless communication system 200, to maintain connectivity, the UE 115 may desire to terminate its connection with the source base station 205 and establish a new connection with a target base station 210. For example, as the UE 115 moves, the UE 115 may approach the limits of the coverage area 215 of the source base station 205. At the same time, however, the UE 115 may have passed within the coverage area 220 of the target base station 210. In some examples, the UE 115 may determine a mobility parameter 235 of the UE 115. The mobility parameter 235 may indicate that the UE 115 is at a particular location, traveling in a particular direction, at a particular speed, other information related to the mobility of the UE 115, or any combination thereof. When the UE 115 approaches the limits of the coverage area 215 of the source base station 205, a handover procedure of the UE 115 between the source base station 205 and the target base station 210 may be initiated.

In some examples of NR, the target base station 210 may communicate with UEs 115 via directional beams 240 (sometimes referred to as beams, directional wireless beams, directional wireless communication links, or the like). The directional beams 240 may be pointed in a specific direction and provide high-bandwidth links between the target base station 210 and the UEs 115. Signal processing techniques, such as beamforming, may be used to coherently combine energy and thereby form the directional beams 240. Directional beams achieved through beamforming may be associated with narrow beams (e.g., "pencil beams") that are highly directional, minimize and/or reduce inter-link interference, and provide high-bandwidth links between wireless nodes (e.g., base stations, access nodes, UEs etc.). In some examples, the target base station 210 may operate in mmW frequency ranges (e.g., 28 GHz, 40 GHz, 60 GHz, etc.). In some examples, the directional beams 240 are transmitted using frequencies greater than 6 GHz. Wireless communication at these frequencies may be associated with increased signal attenuation, for example, path loss, which may be influenced by various factors, such as temperature, barometric pressure, diffraction, etc. Dynamic beam-steering and beam-search capabilities may further support, for example, discovery, link establishment, and beam refinement in the presence of dynamic shadowing and Rayleigh fading. Additionally, communication in such mmW systems may be time division multiplexed, where a transmission may only be directed to one wireless device at a time due to the directionality of the transmitted signal.

Each directional beam 240 may have a beam width 245. The beam width 245 for each directional beam 240 may be different (e.g., compare the beam width 245-*a* of the directional beam 240-*a* to the beam width 245-*c* of the directional beam 240-*c*). The beam width 245 may be related to the size of a phased array antenna used to generate the directional beam 240. Different beam widths 245 may be used by the target base station 210 in different scenarios. For example, a first message may transmitted/received using a directional wireless beam having a first beam width, while a second message may be transmitted/received using a directional wireless beam having a second beam width that is different than the first beam width. The target base station 210 may generate any number of directional beams 240 (e.g., directional beams 240-*a* to 240-N). The directional beam 240 generated by the target base station 210 may be pointed at any geographic location.

As a UE 115 moves in the wireless communication system 200, the UE 115 may move out of the effective range of a particular directional beam 240 (see, e.g., directional beam 240-*a*). Because of the narrow-beam width 245 of the directional beams 240, the directional beams 240 may provide coverage to a small geographic area. In contrast, an omni-directional wireless communications link radiates energy in all directions and covers a wide geographic area.

In some examples, a source base station 205 may coordinate with the target base station 210 to prepare to handover UE 115, but, in some instances, the source base station 205 may delay instructing the UE 115 to execute the handover. For example, the source base station 205 may preemptively prepare the target base station 210 for the handover, but may not immediately initiate the handover.

Delays may complicate the handover procedure when a target base station 210 uses directional beams 240 to establish a communication link with a UE 115. Due to UE mobility, rotation, or signal blockage, channel characteristics of a directional beam 240 may change over time. In particular, channel characteristics of a directional beam 240 may change during the delays of the handover procedure. If a handover delay is lengthy, the handover procedure may fail due to insufficient signal at the time when the handover is to be executed. Accordingly, handover procedures may be adjusted to account for a source base station 205 delaying a handover of a UE 115 to a target base station 210.

Figure 3:
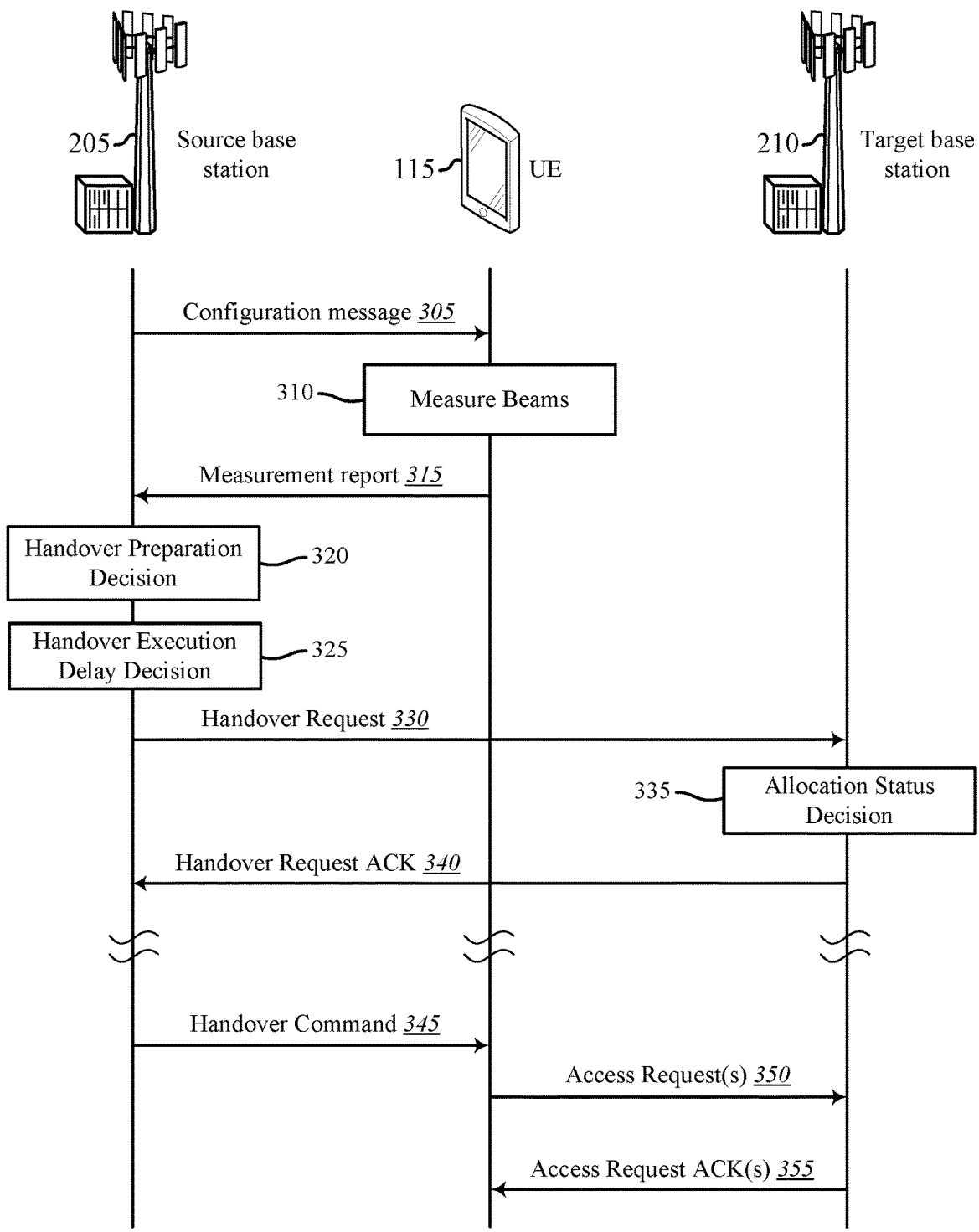
FIG. 3 illustrates an example of a process flowchart that supports a beam-aware handover procedure for multi-beam access systems in accordance with aspects of the present disclosure.

FIG. 3 illustrates an example of a process flowchart 300 that supports a beam-aware handover procedure for multi-beam access systems in accordance with various aspects of the present disclosure. The process flowchart 300 represents communications between a UE 115, a source base station 205, and a target base station 210. The communications and procedures discussed in the process flowchart 300 may be used to execute a handover procedure when the target base station 210 uses directional beams 240. In FIG. 3, the UE 115 may have established a connection with the source base station 205 using known techniques. The process flowchart 300 may begin at 305.

At 305, the source base station 205 may transmit a configuration message 305 to provide the UE 115 with a measurement configuration. In some examples, the source base station 205 may use control signaling (e.g., radio resource control (RRC) signaling)) to send the configuration message 305 (e.g., RRC configuration or reconfiguration message). The configuration message 305 may instruct the UE 115 to perform one or more measurements of one or more directional beams 240 transmitted by a target base station 210 to support a determination of whether to perform a handover to a beam of the target base station 210. FIG. 3 depicts a single target base station 210, but the configuration message 305 may instruct the UE 115 to perform one or more measurements of one or more target base stations. The configuration message 305 may include parameters related to which neighbor base stations (e.g., neighbor cells) and which frequencies and directional beams 240 the UE 115 should measure, criteria for sending measurement reports, intervals for transmission of measurement reports (i.e., measurement gaps), and other related information.

In some examples, the target base station 210 may transmit a defined number of beams (e.g., 128 beams) in a defined number of directions (e.g., over 120 degrees, over 360 degrees, etc.). The target base station 210 may at least occasionally transmit a reference signal and a beam identifier on each beam (e.g., periodically transmit a reference signal). The reference signal may be a new radio synchronization signal (NR-SS), a channel state information reference signal (CSI-RS), or the like. In an example, the configuration message 305 may instruct the UE 115 to measure a reference signal transmitted on one or more beams of the target base station 210.

At 310, the UE 115 may measure one or more beams as instructed in the configuration message 305 and may generate a measurement report that includes the one or more measurements. In some cases, the measurement report may include one or more measurements of a beam, or of multiple beams. The UE 115 may measure one or more of signal quality, signal strength, a signal to noise ratio (SNR), a signal to interference plus noise ratio (SINR), or the like, or any combination thereof. The measurement report may associate a beam identifier with each beam measurement to enable the source base station 205 to associate a measurement with a particular beam. In some examples, the beam identifier may be a logical beam identifier that uniquely identifies a beam (e.g., information on antenna port identification or analog beam identification). In some cases, the measurement report may include a beam identifier for each beam that the UE 115 was able to measure, but may not include any measurements. In some examples, the measurement report may include a beam identifier for each beam the UE 115 was able to measure having a value that satisfies a threshold. For example, the measurement report may include a beam identifier for each measured beam determined to have a SNR at or above a SNR threshold. In some cases, measurement reports may be triggered by events related to the channel conditions of the source base station or the neighbor base stations. Measured signal strengths, comparison to thresholds, determining of event occurrences, mobility parameters, or any combination thereof, may be included in the measurement report.

At 315, the UE 115 may transmit the measurement report to the source base station 205. At 320, the source base station 205 may process the measurement report and may make a handover preparation decision. In some examples, the source base station 205 may process the measurement report and determine not to handover the UE 115 to the target base station 210. In other examples, the source base station 205 may process the measurement report and determine to prepare to handover the UE 115 to the target base station 210. Preparing to handover the UE 115 may involve the source base station 205 coordinating with the target base station 210. In some cases, the target base station 210, when notified of the handover, may allocate time and/or frequency resources for the UE 115 to use to execute the handover. For example, the target base station 210 may allocate one or more beams in one or more time intervals for the UE 115 to use in an access procedure.

At 325, the source base station 205 may make a handover execution delay decision. In some cases, the source base station 205 may not immediately initiate the handover to the target base station 210, and instead may signal to the target base station 210 an intention to handover the UE 115 at a later time (e.g., preemptively prepare the target base station 210 for the handover). In some cases, the source base station 205 may determine that a handover is to be delayed by monitoring one or more mobility parameters 235 of the UE 115 to determine that the UE 115 is leaving the coverage area 215 of the source base station 205 and approaching the coverage area 220 of the target base station 210. The source base station 205 may generate an indicator to indicate whether a handover is a non-delayed handover or a delayed handover. For example, the source base station 205 may indicate that a handover is a delayed handover if the handover is to be delayed for a threshold duration of time (e.g., at least 5 seconds). In some examples, the indicator may be, for example, a binary flag set to a first value if a handover is a non-delayed handover (e.g., set bit to '0') and a second value if a handover is a delayed handover (e.g., set bit to '1'). In other cases, the source base station 205 may estimate an amount of time to delay the handover, and the indicator may include the estimate (e.g., 10 second delay). For example, the source base station 205 may determine not to immediately trigger the handover, but may estimate that the handover will likely occur within a defined amount of time (e.g., within the next 10 seconds).

The source base station 205 may generate a handover request that includes the indicator. The handover request may also include one or more beam identifiers of the one or more beams measured by the UE 115. For example, the source base station 205 may include in the handover request one or more beam identifiers of the beam the UE 115 reported having the highest signal strengths. In some examples, the handover request may include one or more measurements of the one or more beams measured by the UE 115. The source base station 205 may transmit the handover request to the target base station 210 at 330. In some examples, the handover request may be communicated via the backhaul link 225. In some cases, the handover request may include the measurement report.

The target base station 210 may receive and process the handover request and may, at 335, make an allocation status decision. The allocation status decision may be a determination of whether to allocate one or more beams to the UE 115 for the handover. In some instances, the target base station 210 may process the indicator in the handover request to determine whether to allocate one or more beams. If the indicator in the handover request indicates that the handover is not being delayed, the target base station 210 may make an allocation status decision determining to allocate one or more beams for the handover. The target base station 210 may select values for one or more access parameters for the UE 115 to use in an access procedure during the handover. In some cases, the target base station 210 may make an allocation status decision determining not to allocate one or more beams for the handover. For example, the target base station 210 may determine not to allocate any beams if the handover is being delayed or is being delayed by more than a defined amount (e.g., more than 5 seconds). In some cases, the target base station 210 may allocate one or more beams even if the handover is being delayed or is being delayed by less than a defined amount (e.g., less than 5 seconds).

In some examples, determining whether to allocate one or more directional beams 240 may be based at least in part on network latency, network traffic, mobility parameters of the UE 115, availability of communication resources, or a combination thereof. In some examples, the determination of whether to allocate one or more directional beams 240 may be based on information included in the measurement report generated at 315. In some examples, the target base station 210 may initiate one or more measurements, messages, or other means to gather additional information about the location and the mobility of the UE 115. The determination of whether to allocate one or more directional beams 240 may be based at least in part on the information included in the measurement report and the additional information gathered directly by the target base station 210. Based at least in part on the information, the target base station 210 may then determine whether beam-specific parameters may be selected for a set of beams selected for allocation of a handover and how large the set of beams may be. For example, if the position of the UE 115 estimated based on the information requires a large coverage area for the target base station 210 (e.g., the estimated position may be near an end of a sweeping range of the target base station 210), the target base station 210 may use a set of selected beams having a beam width set at a narrowest value available to sweep the large coverage area. The narrowest value available (e.g., a 0.35-degree beam width) may be determined by a manufacturer of the antenna ports associated with the target base station 210.

If one or more beams are being allocated, the target base station 210 may determine values of access parameters for the one or more allocated beams. In some examples, determining values for the access parameters for the one or more directional beams 240 may be based at least in part on estimated latency, network traffic, mobility parameters of the UE 115, availability of communication resources, or a combination thereof. The one or more access parameters may be used by the UE 115 in an access procedure to obtain access to the target base station 210 during handover. In some examples, the access parameters for a directional beam may include, for example, one or more of a preamble, a physical random access channel (PRACH) mask, a beam identifier, a transmission window, a response window, priority information, a power level, or any combination thereof.

In some examples, each directional beam 240 may be associated with a transmission window. In some handover procedures, when a dedicated preamble is used, the target base station 210 dedicates a particular duration of time to receive a RACH message from the UE 115 that is assigned the dedicated preamble. The transmission window may indicate a start time of the particular duration of time, an end time of the particular duration of time, a duration of the particular duration of time, other characteristics of the particular duration of time, or any combination thereof. In some examples, the transmission window may be determined by the target base station 210.

The target base station 210 may determine a response window for each directional beam 240 such that no response window overlaps with another response window. In some examples, the UE 115 may be able to monitor only one directional wireless beam at a time, and a dedicated time to monitor each beam may be set aside as a response window. The access parameter may include information expressing the transmission window, the response window, or both, in time, subframes, slots, mini-slots, or any combination thereof. For example, the start time of the response window may be a certain subframe. In another example, a response window designated for a directional beam may be assigned a start time and end time.

In some examples, the access parameters may also include priority information associated with multiple directional beams 240. The priority information may indicate a ranking of the directional beams 240. For example, the priority information may indicate that a UE 115 should first attempt to communicate via a first directional beam 240-*a*, next, the UE 115 should attempt to communication via a second directional beam 240-*b*, and so forth. In some examples, the priority information may include other data related to the directional beams 240. In some examples, the access parameters may include power levels for the transmission of RACH messages or other messages.

The target base station 210 may generate a handover request acknowledgment (ACK) indicating whether any beams are being allocated for the handover. If no beams are being allocated, the handover request ACK may indicate that no beams have been allocated. In some examples, even if no beams are being allocated, the handover request ACK may include a beam identifier and a preamble that the UE 115 may use for contention free access using a beam associated with the beam identifier. If one or more beams are being allocated, the handover request ACK may include one or more beam identifiers of the one or more beams being allocated. The handover request ACK may also include values for one or more access parameters for the UE 115 to use in an access procedure during the handover.

The target base station 210 may, at 340, transmit the handover request ACK to the source base station 205. In some examples, the handover request ACK may be communicated via the backhaul link 225. The handover request ACK may include a beam identifier of the one or more selected beams. The handover request ACK may include the selected one or more access parameters associated with the selected one or more beams. In some cases, the source base station 205 may receive and process the handover request ACK, and then send a handover command to the UE 115 at 345. The handover command may be, for example, an RRC reconfiguration message. In a non-delayed handover, the source base station 205 may not intentionally delay sending the handover command, and receipt of the handover request ACK may trigger the source base station 205 to send the handover command. Triggering may include processing delays for the source base station 205 to receive and interpret the handover request ACK, and then generate the handover command based on the handover request ACK. In a delayed handover, the source base station 205 may intentionally delay sending the handover command for a defined amount of time. The intentional delay is represented in FIG. 3 by wavy lines between receipt of the handover request ACK at 340 and transmission of the handover command at 345.

Upon receiving the handover command at 345, the UE 115 may generate an access request based at least in part on the handover command to initiate an access procedure (e.g., a random access procedure). For instance, the access request may be a random access channel (RACH) message generated based at least in part on the one or more access parameters received in the handover command. For example, a RACH message intended to be transmitted on a first directional beam 240-a may include a preamble included in the one or more access parameters associated with the first directional beam 240. The UE 115 may transmit the access request on the first directional beam 240-a during a transmission window associated with the first directional beam 240-a. In some examples, the handover command may identify multiple beams and include one or more access parameters associated with each beam. The UE 115 may generate and transmit an access request using multiple or all of the directional beams 240 identified in the handover command.

Upon receiving an access request from the UE 115, the target base station 210 may generate and transmit an access request ACK to the UE 115 at 355. In some examples, access request and the access request ACK may be transmitted via a same directional beam 240. In other examples, the access request ACK may be transmitted on a different directional beam (e.g., omni-directional communication link or other directional wireless communication link).

In some examples, the target base station 210 may generate and transmit an access request ACK on each directional beam on which an access request was received. In other examples, the target base station 210 may transmit a single access request ACK. The access request ACK may be configured to synchronize communications between the target base station 210 and the UE 115. The access request ACK may include, for example, one or more of timing alignment data, initial uplink grant(s), timing alignment data for downlink data arrival case(s), a response preamble identifier, other relevant information, or any combinations thereof.

In some cases, the target base station 210 may determine which directional beam 240 to use to establish communication with the UE 115. In some examples, the target base station 210 may receive access requests on multiple beams 240 and may select which one or more directional beams 240 to use. Before transmitting an access request ACK using any beam, the target base station 210 may determine which one or more directional beams 240 to use and transmit access request ACKs on those directional wireless communication link(s) exclusively.

In some instances, the UE 115 may receive multiple access request ACKs via multiple directional beams 240 and select which one or more directional beams 240 to use to communicate with the target base station 210. The UE 115 and the target base station 210 may communicate on one or more selected beams using the information included in the access request ACK corresponding to the selected one or more beams (e.g., timing alignment data for both uplink and downlink transmissions). A handover is considered complete when communication is establish between the UE 115 and the target base station 210 via a particular beam. In some examples, upon successful completion of a handover procedure, the UE 115 may transmit a confirmation message to the target base station 210 and/or the source base station 205.

In some cases, expiration information may be associated with one or more access parameters to prevent the UE 115 from attempting to perform an access parameter using stale access parameters. The target base station 210 may select values for access parameters based on the channel conditions at the time those parameters were selected. Using stale access parameters may result in handover failures because values of those access parameters may no longer be suitable for current channel conditions.

Figure 4:
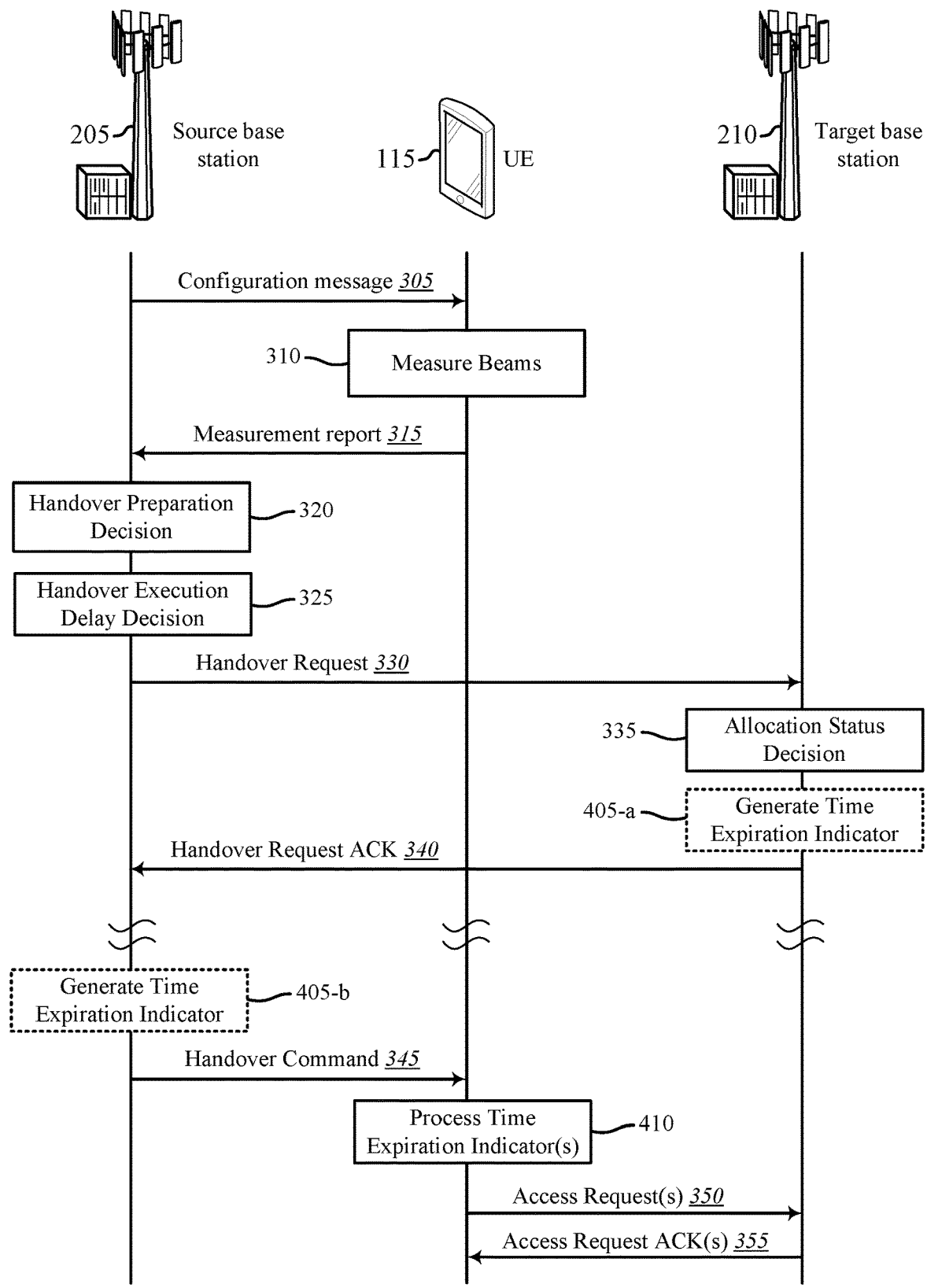
FIG. 4 illustrates an example of a process flowchart that supports a beam-aware handover procedure for multi-beam access systems in accordance with aspects of the present disclosure.

FIG. 4 illustrates an example of a process flowchart 400 that supports a beam-aware handover procedure for multibeam access systems in accordance with various aspects of the present disclosure. Operations 305-355 in FIG. 4 are the same or similar to operations of the same number in FIG. 3. Operations 405-a, 405-b, and 410 have been added corresponding to the creation and processing of one or more time expiration indicators to reduce or eliminate the use of stale access parameters.

Operations 305-335 may be performed as described above with reference to FIG. 3. However, the source base station 205 need not generate or transmit to the target base station 210 an indicator to indicate whether a handover is a non-delayed handover or a delayed handover (at operations 325 and 330). The indicator could be generated and transmitted, but need not be.

At 405-a, the target base station 210 optionally may generate a time expiration indicator to include in the handover request ACK. Additionally or alternatively, the target base station 210 may include the indicator in the access request ACK transmitted to the UE 115 at 355 or in another message transmitted to the UE 115. The time expiration indicator may be associated with a time when the one or more access parameters expire, or a time interval within which the one or more access parameters are valid, or the like. In an example, the time expiration indicator may include a time stamp that indicates, or may be used to derive, when the one or more access parameters expire. For example the target base station 210 may set an expiration time for one or more access parameters based at least in part on a time indicated in a time stamp. The time stamp may indicate a time of creation of the one or more access parameters, which may be used to calculate when the one or more access parameters expire. In other examples, the time expiration indicator may include two time stamps where a first time stamp lists a beginning time of when the one or more access parameters become valid and a second time stamp that lists an ending time after which the one or more access parameters are no longer valid. In additional examples, the time expiration indicator may include a maximum attempt number indicating a maximum number of attempts to be made by the UE 115 for handover using the one or more access parameters.

In some examples, the target base station 210 may select one or more beams to allocate for the handover and the time expiration indicator may be used to indicate when one or more access parameters are valid. In some cases, multiple beams may be simultaneously allocated where the UE 115 may use any of the beams for the handover. The time expiration indicator may indicate a time of expiration or a time interval in which the one or more access parameters are valid. In other cases, multiple beams may be sequentially allocated and the UE 115 may use any of a first subset of the multiple beams for a handover during a first time interval, any of a second subset of the multiple beams for a handover during a second time interval, any of a third subset of the multiple beams for a handover during a third time interval, and so forth. A beam subset may include one or more beams of the set of multiple beams that have been allocated by the target base station at 335. The time expiration indicator may indicate a time interval in which the one or more access parameters associated with each beam subset are valid. In some cases, the time intervals may overlap, and in others, the time intervals may be distinct. For example, a first set of one or more access parameters may be valid during a first time interval, and a second set of one or more access parameters may be valid during a second time interval.

The target base station 210 may generate and include one or more time expiration indicators in the handover request ACK. In some cases, the time expiration indicator may correspond to all of the one or more access parameters. In other cases, the handover request ACK may include multiple time expiration indicators that respectively correspond to one or more access parameters (e.g., define a first time interval for one or more access parameters associated with a first beam, a second interval time interval for one or more access parameters associated with a second beam, etc.).

In some examples, the source base station 205 instead of, or in addition to, the target base station 210, may generate a time expiration indicator at 405-b. In some examples, the time expiration indicator may indicate whether one or more access parameters received in the handover request ACK are outdated. The source base station 205 may determine that the one or more access parameters are outdated if, for example, a time at which the source base station 205 received the handover request ACK differs from a current time by more than a defined amount of time (e.g., more than 2 minute ago). In some examples, the time expiration indicator may be a binary flag having a first value to indicate that the one or more access parameters are outdated (e.g., bit set to '0') and a second value to indicate that the one or more access parameters are not outdated (e.g., bit set to '1'). The source base station 205 may, for example, set the binary flag based on a difference between a time at which the source base station 205 received the handover request ACK and a current time. In additional examples, the time expiration indicator may be a time stamp that indicates a time when the source base station 205 received the handover request ACK with the one or more access parameters. The UE 115, for example, may use the time stamp for determining an age of the one or more access parameters. In further examples, the time expiration indicator may indicate an age of the one or more access parameters.

At 345, the source base station 205 may transmit a handover command. The handover command may be the same as the handover command described in FIG. 3, but may also include one or more time expiration indicators. The one or more time expiration indicators may have been generated by either or both of the source base station 205 and the target base station 210.

The UE 115 may receive the handover command and process the one or more time expiration indicators at 410. In some examples, the UE 115 may process the one or more time expiration indicators to determine an expiration status of each of the one or more access parameters. The expiration status may indicate whether the one or more access parameters are expired. In an example, a time expiration indicator may be a time stamp, and the UE 115 may derive a time of expiration for one or more the one or more access parameters from a time indicated in the time stamp. For example, the UE 115 may determine a difference between a current time and a time indicated in the time stamp, and compare the difference to a threshold for determining whether the one or more access parameters have expired (e.g., difference exceeds threshold).

In an example, the UE 115 may determine that none of the one or more access parameters have expired, and then use the one or more parameters to perform a handover to the target base station 210 in the manner described above in operations 350 and 355 of FIG. 3. If, however, the maximum attempt number has been met for the one or more access parameters, the UE 115 may operate as if the one or more parameters are expired, as described below.

In other examples, the UE 115 may process the one or more time expiration indicators to determine an expiration status of each of the one or more parameters, and determine that some or all of the one or more access parameters have expired. The UE 115 may use any of the one or more access parameters that have not expired to perform a handover to the target base station 210 in the manner described above in operations 350 and 355 of FIG. 3. If, however, the maximum attempt number has been met for the one or more access parameters, the UE 115 may operate as if the one or more parameters are expired, as described below.

In other examples, the UE 115 may process the one or more time expiration indicators to determine an expiration status of each of the one or more parameters, and determine that all of the one or more access parameters have expired. Also, the UE 115 may attempt to perform an access procedure up to a maximum attempt number of times, and may fail to establish a connection with the target base station 210. Either way, the UE 115 may obtain one or more different access parameters from the target base station 210 to use for the access procedure. The one or more different access parameters may be different than the one or more access parameters included in the handover request ACK. For example, the UE 115 may obtain the one or more different access parameters from the target base station 210 via the handover command. For instance, the target base station 210 may identify in the handover request ACK dedicated resources (e.g., a set of RACH resources) that the UE 115 may use for contention-free access. For example, the dedicated resources may include a dedicated preamble that the UE 115 may transmit in an access request on a particular beam for contention-free access. The source base station 205 may include the dedicated preamble in the handover command.

In another example, the UE 115 may monitor for a downlink reference signal transmitted by the target base station 210. The downlink reference signal may specify a beam 240 to use for an access procedure. The UE 115 may then use the specified beam to transmit an access request (e.g., a physical random access channel (PRACH) message, a RACH message, etc.) that includes the dedicated preamble for contention-free access. The UE 115 may perform an access procedure similar to that described in operations 350, 355 of FIG. 3 using the one or more different access parameters to establish a connection with the target base station 210 to complete the handover.

Beneficially, a source base station 205 may be permitted to preemptively prepare a UE 115 for handover to a target base station 210, and thus, improve handover failure.

Figure 5:
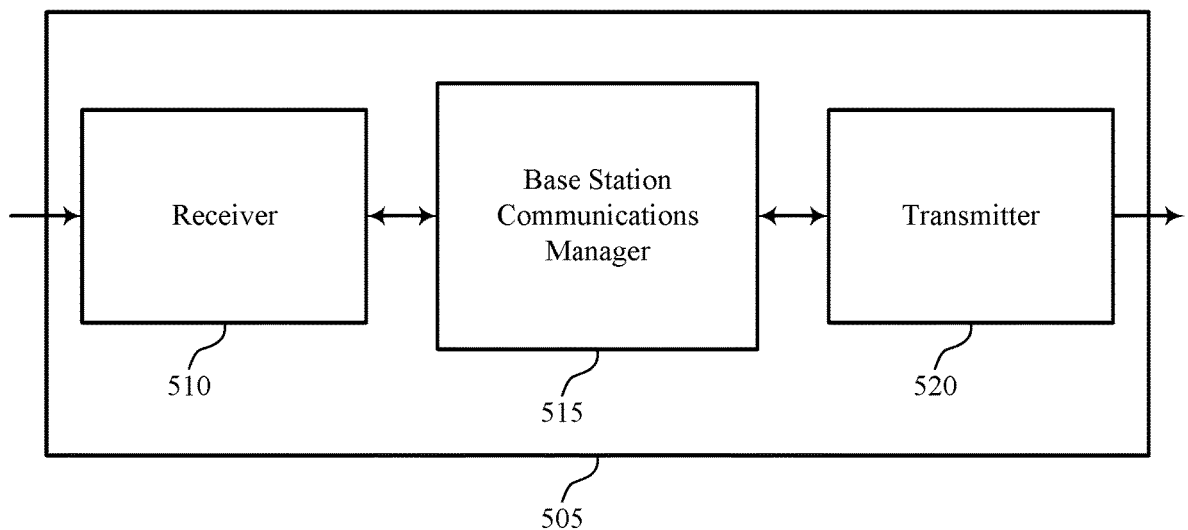
FIGS. 5 through 7 show block diagrams of a device that supports a beam-aware handover procedure for multi-beam access systems in accordance with aspects of the present disclosure.

FIG. 5 shows a block diagram 500 of a wireless device 505 that supports a beam-aware handover procedure for multi-beam access systems in accordance with aspects of the present disclosure. Wireless device 505 may be an example of aspects of a base station 105 as described with reference to FIG. 1. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to a beam-aware handover procedure for multi-beam access systems, etc.). Information may be passed on to other components of the device 505. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515, implemented at a source base station, may determine that a handover request is to be sent to a target base station in preparation for handover of a UE from the source base station to the target base station and transmit the handover request to the target base station with an indication of whether the handover is to be delayed.

In some examples, the base station communications manager 515, implemented at a source base station, may also receive, from a target base station, a first message including an access parameter of a beam allocated for a handover of a UE from the source base station to the target base station, generate a time expiration indicator associated with the access parameter, and transmit, to the UE, a second message that includes the access parameter and the time expiration indicator.

In some examples, the base station communications manager 515, implemented at a target base station, may receive, from a source base station, a handover request in preparation for handover of a UE from the source base station to the target base station, the handover request including an indication of whether the handover is to be delayed and transmit a handover request acknowledgment in response to the handover request.

In some examples, the base station communications manager 515, implemented at a target base station, may receive, from a source base station, a handover request in preparation for handover of a UE from the source base station to the target base station, select an access parameter of a beam being allocated for the handover and a time expiration indicator associated with the access parameter, and transmit, to the source base station, a handover request acknowledgment that includes the access parameter and the time expiration indicator.

Transmitter 520 may transmit signals generated by other components of the device 505. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
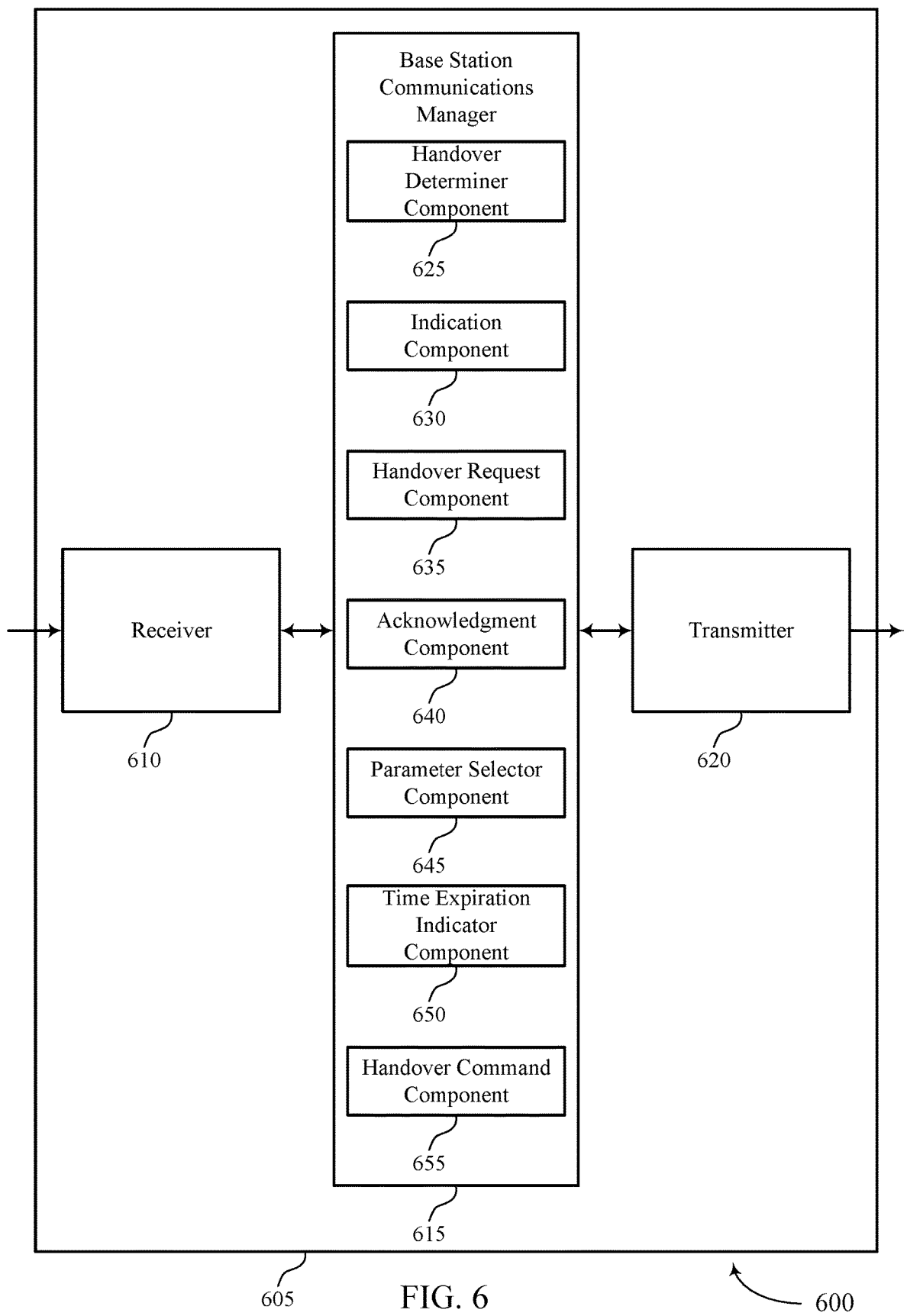

FIG. 6 shows a block diagram 600 of a wireless device 605 that supports a beam-aware handover procedure for multi-beam access systems in accordance with aspects of the present disclosure. Wireless device 605 may be an example of aspects of a wireless device 505 or a base station 105 as described with reference to FIGS. 1 and 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to a beam-aware handover procedure for multi-beam access systems, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8.

Base station communications manager 615 may also include handover determiner component 625, indication component 630, handover request component 635, acknowledgment component 640, parameter selector component 645, time expiration indicator component 650, and handover command component 655.

Handover determiner component 625, implemented at a source base station, may determine that a handover request is to be sent to a target base station in preparation for handover of a UE from the source base station to the target base station and receive, from the target base station, a handover request acknowledgement that includes an access parameter. In some cases, the handover request acknowledgement includes a second access parameter, where the access parameter is associated with a first time interval and the second access parameter is associated with a second time interval.

Indication component 630, implemented at a source base station, may determine that the handover is to be delayed for a threshold duration of time, where the indication is based on the determination of the delay and transmit the handover request to the target base station with an indication of whether the handover is to be delayed. In some cases, the indication is a binary flag that indicates the handover is one of a non-delayed handover and a delayed handover.

Handover request component 635, implemented at a target base station, may receive, from a source base station, a handover request in preparation for handover of a UE from the source base station to the target base station, the handover request including an indication of whether the handover is to be delayed. Handover request component 635 may receive, from a source base station, a handover request in preparation for handover of a UE from the source base station to the target base station, and receive, from a target base station, a first message including an access parameter of a beam allocated for a handover of a UE from the source base station to the target base station.

In some cases, the indication is a binary flag that indicates the handover is one of a non-delayed handover and a delayed handover. In some cases, the handover request includes one or more beam identifiers of beams associated with the target base station. In some cases, the handover request includes beam measurements corresponding to the one or more beam identifiers. In some cases, the handover request acknowledgment includes the one or more beam identifiers. In some cases, the handover request includes one or more beam identifiers of beams associated with the target base station. In some cases, the handover request includes beam measurements corresponding to the one or more beam identifiers. In some cases, the handover request acknowledgment includes the one or more beam identifiers.

Acknowledgment component 640, implemented at a target base station, may transmit a handover request acknowledgment in response to the handover request and transmit, to the source base station, a handover request acknowledgment that includes the access parameter and the time expiration indicator.

Parameter selector component 645, implemented at a target base station, may select an access parameter associated with the beam, where the handover request acknowledgment includes the access parameter, and select a second access parameter associated with the second beam, where the access parameter is associated with a first time interval and the second access parameter is associated with a second time interval and where the handover request acknowledgement includes the second access parameter. In some cases, the second access parameter is a dedicated preamble for contention-free access. Parameter selector component 645 may select an access parameter of a beam being allocated for the handover and a time expiration indicator associated with the access parameter.

Time expiration indicator component 650, implemented at either a source base station or a target base station, may generate a time stamp associated with an expiration time of the access parameter, where the handover request acknowledgement includes the time stamp. Time expiration indicator component 650 may set an expiration time for the access parameter based on a time indicated in the time stamp, and generate a time expiration indicator associated with the access parameter. In some cases, the handover request acknowledgement includes a time stamp associated with a time when the access parameter expires. In some cases, the time expiration indicator is a maximum attempt number, indicating a maximum number of attempts to be made by the UE for handover using the access parameter. In some cases, the time expiration indicator indicates an age of the access parameter. In some cases, the time expiration indicator is a binary flag that indicates whether the access parameter is outdated. In some cases, the time expiration indicator is a time value that indicates a time of receipt of the access parameter by the source base station from the target base station.

Handover command component 655, implemented at a source base station, may transmit, to the UE, a handover command that includes the access parameter to initiate execution of the handover of the UE from the source base station to the target base station and transmit, to the UE, a second message that includes the access parameter and the time expiration indicator. In some cases, transmitting the handover command further includes: delaying transmission of the handover command.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
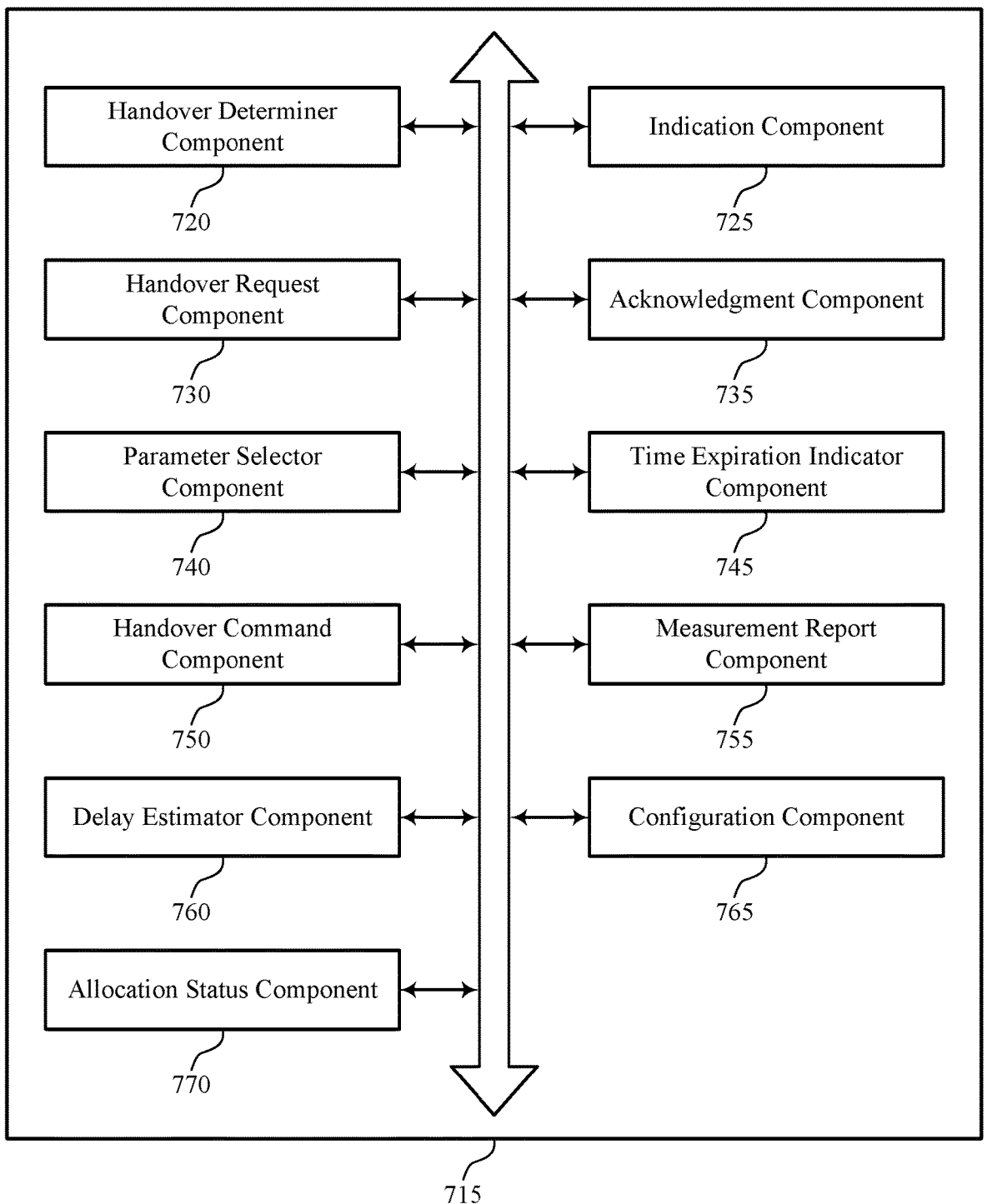

FIG. 7 shows a block diagram 700 of a base station communications manager 715 that supports a beam-aware handover procedure for multi-beam access systems in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include handover determiner component 720, indication component 725, handover request component 730, acknowledgment component 735, parameter selector component 740, time expiration indicator component 745, handover command component 750, measurement report component 755, delay estimator component 760, configuration component 765, and allocation status component 770. Each of these modules may communicate, directly or indirectly, with one another (e.g., via one or more buses).

Handover determiner component 720, implemented at a source base station, may determine that a handover request is to be sent to a target base station in preparation for handover of a UE from the source base station to the target base station and receive, from the target base station, a handover request acknowledgement that includes an access parameter. In some cases, the handover request acknowledgement includes a second access parameter, where the access parameter is associated with a first time interval and the second access parameter is associated with a second time interval.

Indication component 725, implemented at a source base station, may determine that the handover is to be delayed for a threshold duration of time, where the indication is based on the determination of the delay and transmit the handover request to the target base station with an indication of whether the handover is to be delayed. In some cases, the indication is a binary flag that indicates the handover is one of a non-delayed handover and a delayed handover.

Handover request component 730, implemented at a target base station, may receive, from a source base station, a handover request in preparation for handover of a UE from the source base station to the target base station, the handover request including an indication of whether the handover is to be delayed, receive, from a source base station, a handover request in preparation for handover of a UE from the source base station to the target base station. Handover request component 730 may receive, from a target base station, a first message including an access parameter of a beam allocated for a handover of a UE from the source base station to the target base station.

In some cases, the indication is a binary flag that indicates the handover is one of a non-delayed handover and a delayed handover. In some cases, the handover request includes one or more beam identifiers of beams associated with the target base station. In some cases, the handover request includes beam measurements corresponding to the one or more beam identifiers. In some cases, the handover request acknowledgment includes the one or more beam identifiers. In some cases, the handover request includes one or more beam identifiers of beams associated with the target base station. In some cases, the handover request includes beam measurements corresponding to the one or more beam identifiers. In some cases, the handover request acknowledgment includes the one or more beam identifiers.

Acknowledgment component 735, implemented at a target base station, may transmit a handover request acknowledgment in response to the handover request and transmit, to the source base station, a handover request acknowledgment that includes the access parameter and the time expiration indicator.

Parameter selector component 740, implemented at a target base station, may select an access parameter associated with the beam, where the handover request acknowledgment includes the access parameter. Parameter selector component 740 may select a second access parameter associated with the second beam, where the access parameter is associated with a first time interval and the second access parameter is associated with a second time interval, and where the handover request acknowledgement includes the second access parameter. Parameter selector component 740 may select an access parameter of a beam being allocated for the handover and a time expiration indicator associated with the access parameter. In some cases, the second access parameter is a dedicated preamble for contention-free access.

Time expiration indicator component 745, implemented at either a source base station or a target base station, may generate a time stamp associated with an expiration time of the access parameter, where the handover request acknowledgement includes the time stamp. Time expiration indicator component 745 may set an expiration time for the access parameter based on a time indicated in the time stamp, and generate a time expiration indicator associated with the access parameter. In some cases, the handover request acknowledgement includes a time stamp associated with a time when the access parameter expires. In some cases, the time expiration indicator is a maximum attempt number, indicating a maximum number of attempts to be made by the UE for handover using the access parameter. In some cases, the time expiration indicator indicates an age of the access parameter. In some cases, the time expiration indicator is a binary flag that indicates whether the access parameter is outdated. In some cases, the time expiration indicator is a time value that indicates a time of receipt of the access parameter by the source base station from the target base station.

Handover command component 750, implemented at a source base station, may transmit, to the UE, a handover command that includes the access parameter to initiate execution of the handover of the UE from the source base station to the target base station and transmit, to the UE, a second message that includes the access parameter and the time expiration indicator. In some cases, transmitting the handover command further includes: delaying transmission of the handover command.

Measurement report component 755, implemented at a source base station, may receive, from the UE, a measurement report that includes one or more beam identifiers of beams associated with the target base station, where the handover request includes the one or more beam identifiers. In some cases, the measurement report includes beam measurements corresponding to the one or more beam identifiers.

Delay estimator component 760, implemented at a source base station, may estimate an amount of time to delay the handover, where the estimate of the amount of time is included in the indication.

Configuration component 765, implemented at a source base station, may transmit a measurement configuration that instructs the UE to measure a set of different beams.

Allocation status component 770, implemented at a target base station, may determine an allocation status for a beam that indicates whether the beam is being allocated for the handover based on the indication and determine to allocate a second beam for the handover. In some cases, determining the allocation status includes determining to allocate the beam for the handover, where the handover request acknowledgment includes a beam identifier of the beam. In some cases, determining the allocation status includes determining to allocate the beam for the handover. In some cases, determining the allocation status includes: determining to allocate a second beam for the handover.

Figure 8:
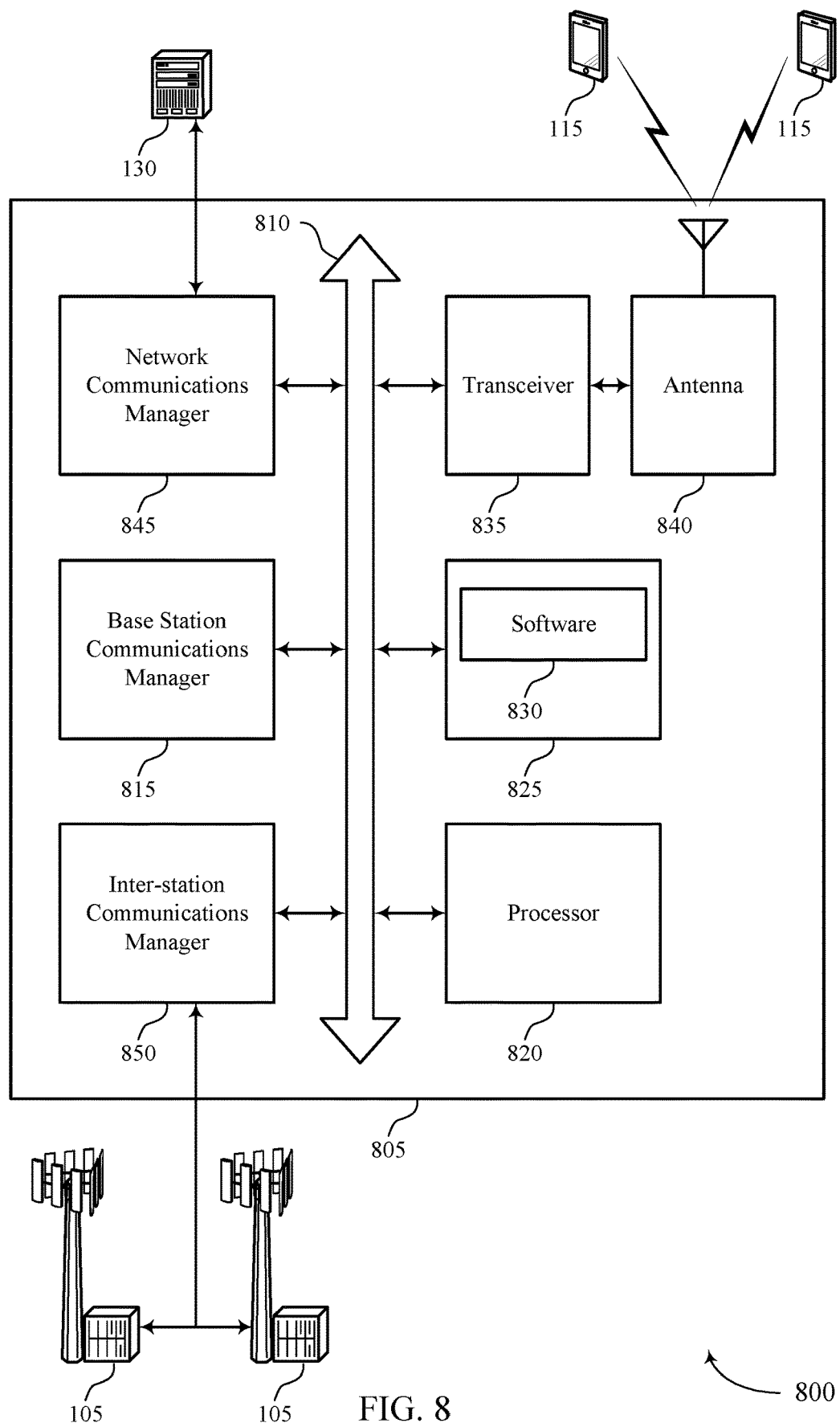
FIG. 8 illustrates a block diagram of a system including a base station that supports a beam-aware handover procedure for multi-beam access systems in accordance with aspects of the present disclosure.

FIG. 8 shows a diagram of a system 800 including a device 805 that supports a beam-aware handover procedure for multi-beam access systems in accordance with aspects of the present disclosure. Device 805 may be an example of or include the components of wireless device 505, wireless device 605, or a base station 105 as described above, e.g., with reference to FIGS. 1, 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting a beam-aware handover procedure for multi-beam access systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support a beam-aware handover procedure for multi-beam access systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device 805 may include a single antenna 840. However, in some cases the device 805 may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an Long Term Evolution (LTE)/LTE-A wireless communication network technology to provide communication between base stations 105.

Figure 9:
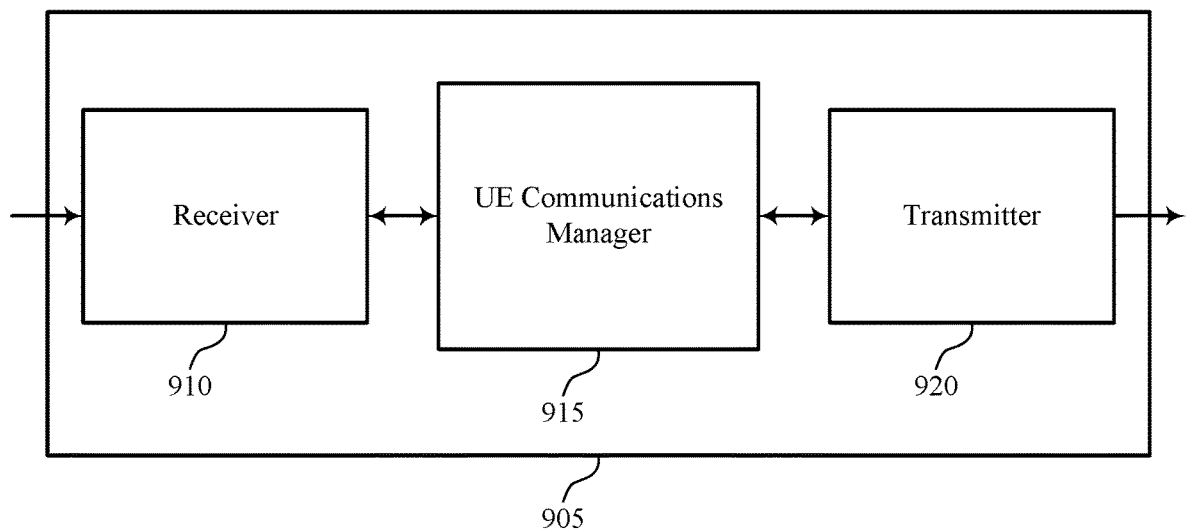
FIGS. 9 through 11 show block diagrams of a device that supports a beam-aware handover procedure for multi-beam access systems in accordance with aspects of the present disclosure.

FIG. 9 shows a block diagram 900 of a wireless device 905 that supports a beam-aware handover procedure for multi-beam access systems in accordance with aspects of the present disclosure. Wireless device 905 may be an example of aspects of a UE 115 as described with reference to FIG. 1. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to a beam-aware handover procedure for multi-beam access systems, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices.

In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive an access parameter associated with a target base station and a time expiration indicator associated with the access parameter, process the time expiration indicator to determine an expiration status of the access parameter, and perform a handover from a source base station to the target base station based on the expiration status of the access parameter.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
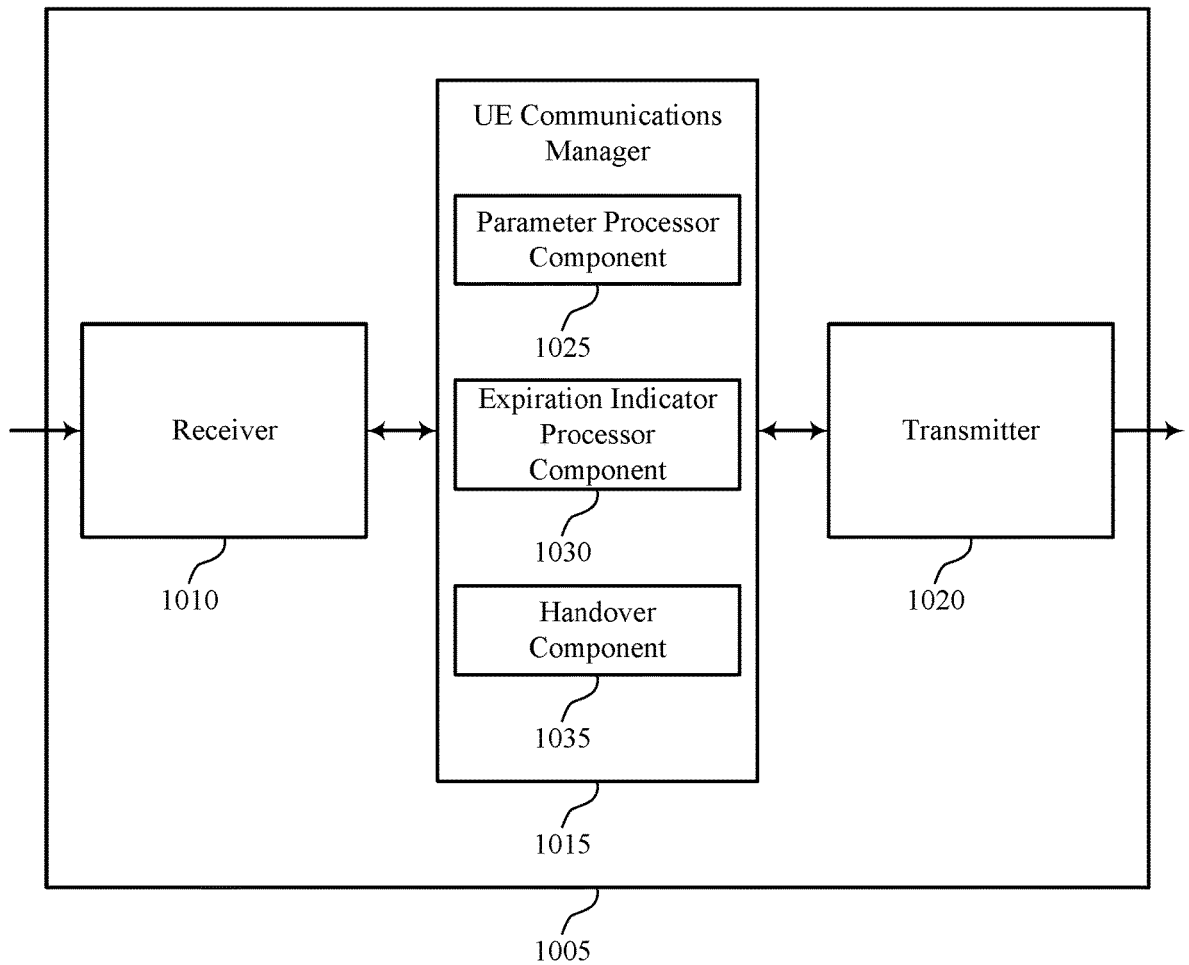

FIG. 10 shows a block diagram 1000 of a wireless device 1005 that supports a beam-aware handover procedure for multi-beam access systems in accordance with aspects of the present disclosure. Wireless device 1005 may be an example of aspects of a wireless device 905 or a UE 115 as described with reference to FIGS. 1 and 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to a beam-aware handover procedure for multi-beam access systems, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include parameter processor component 1025, expiration indicator processor component 1030, and handover component 1035.

Parameter processor component 1025 may receive an access parameter associated with a target base station and a time expiration indicator associated with the access parameter.

Expiration indicator processor component 1030 may process the time expiration indicator to determine an expiration status of the access parameter, derive a time of expiration of the access parameter from the time stamp, and receive a second access parameter associated with the target base station. In some cases, the access parameter is associated with a first time interval and the second access parameter is associated with a second time interval. In some cases, the time expiration indicator is a time stamp. In some cases, the time expiration indicator is a maximum attempt number, indicating a maximum number of attempts to be made by the UE for handover using the access parameter.

In some cases, the expiration status indicates that the access parameter is not expired, and where performing the handover includes performing an access procedure using the access parameter to establish a connection with the target base station. In some cases, the expiration status indicates that the access parameter is expired, and where performing the handover includes performing an access procedure using the second access parameter to establish a connection with the target base station. In some cases, the time expiration indicator indicates an age of the access parameter. In some cases, the time expiration indicator is a binary flag that indicates whether the access parameter is outdated. In some cases, the time expiration indicator is a time value that indicates a time of receipt of the access parameter by the source base station from the target base station.

Handover component 1035 may perform a handover from a source base station to the target base station based on the expiration status of the access parameter, perform an access procedure using the second access parameter to establish a connection with the target base station, and transmit a random access channel (RACH) message to the target base station using the transmission beam and the dedicated preamble.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
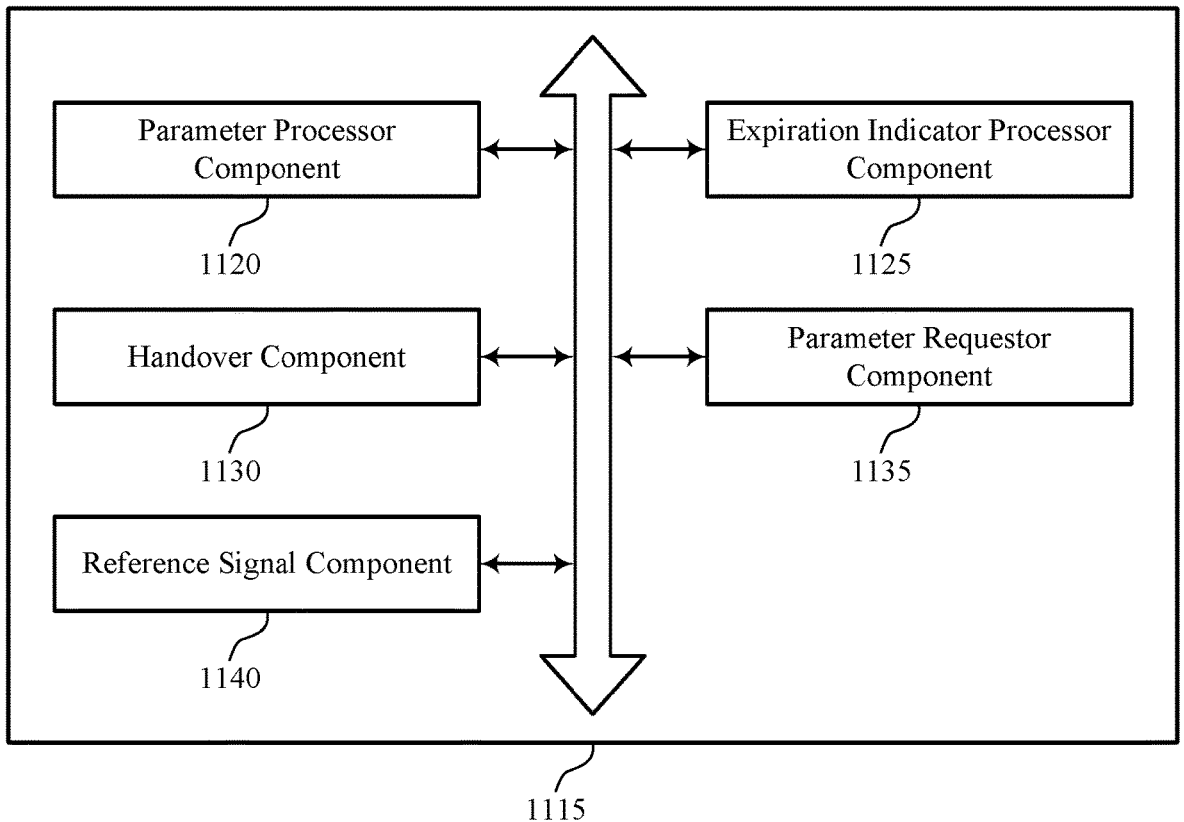

FIG. 11 shows a block diagram 1100 of a UE communications manager 1115 that supports a beam-aware handover procedure for multi-beam access systems in accordance with aspects of the present disclosure. The UE communications manager 1115 may be an example of aspects of a UE communications manager 915, 1015, and 1215 described with reference to FIGS. 9, 10, and 12. The UE communications manager 1115 may include parameter processor component 1120, expiration indicator processor component 1125, handover component 1130, parameter requestor component 1135, and reference signal component 1140. Each of these modules may communicate, directly or indirectly, with one another (e.g., via one or more buses).

Parameter processor component 1120 may receive an access parameter associated with a target base station and a time expiration indicator associated with the access parameter.

Expiration indicator processor component 1125 may process the time expiration indicator to determine an expiration status of the access parameter, derive a time of expiration of the access parameter from the time stamp, and receive a second access parameter associated with the target base station. In some cases, the access parameter is associated with a first time interval and the second access parameter is associated with a second time interval. In some cases, the time expiration indicator is a time stamp. In some cases, the time expiration indicator is a maximum attempt number, indicating a maximum number of attempts to be made by the UE for handover using the access parameter.

In some cases, the expiration status indicates that the access parameter is not expired, and where performing the handover includes performing an access procedure using the access parameter to establish a connection with the target base station. In some cases, the expiration status indicates that the access parameter is expired, and where performing the handover includes performing an access procedure using the second access parameter to establish a connection with the target base station. In some cases, the time expiration indicator indicates an age of the access parameter. In some cases, the time expiration indicator is a binary flag that indicates whether the access parameter is outdated. In some cases, the time expiration indicator is a time value that indicates a time of receipt of the access parameter by the source base station from the target base station.

Handover component 1130 may perform a handover from a source base station to the target base station based on the expiration status of the access parameter, perform an access procedure using the second access parameter to establish a connection with the target base station, and transmit a RACH message to the target base station using the transmission beam and the dedicated preamble.

Parameter requestor component 1135 may determine that an expiration status indicates that the access parameter is expired and may obtain a second access parameter from the target base station. In some cases, the second access parameter is a dedicated preamble for contention-free access.

Reference signal component 1140 may identify a transmission beam to use based on receipt of a downlink reference signal.

Figure 12:
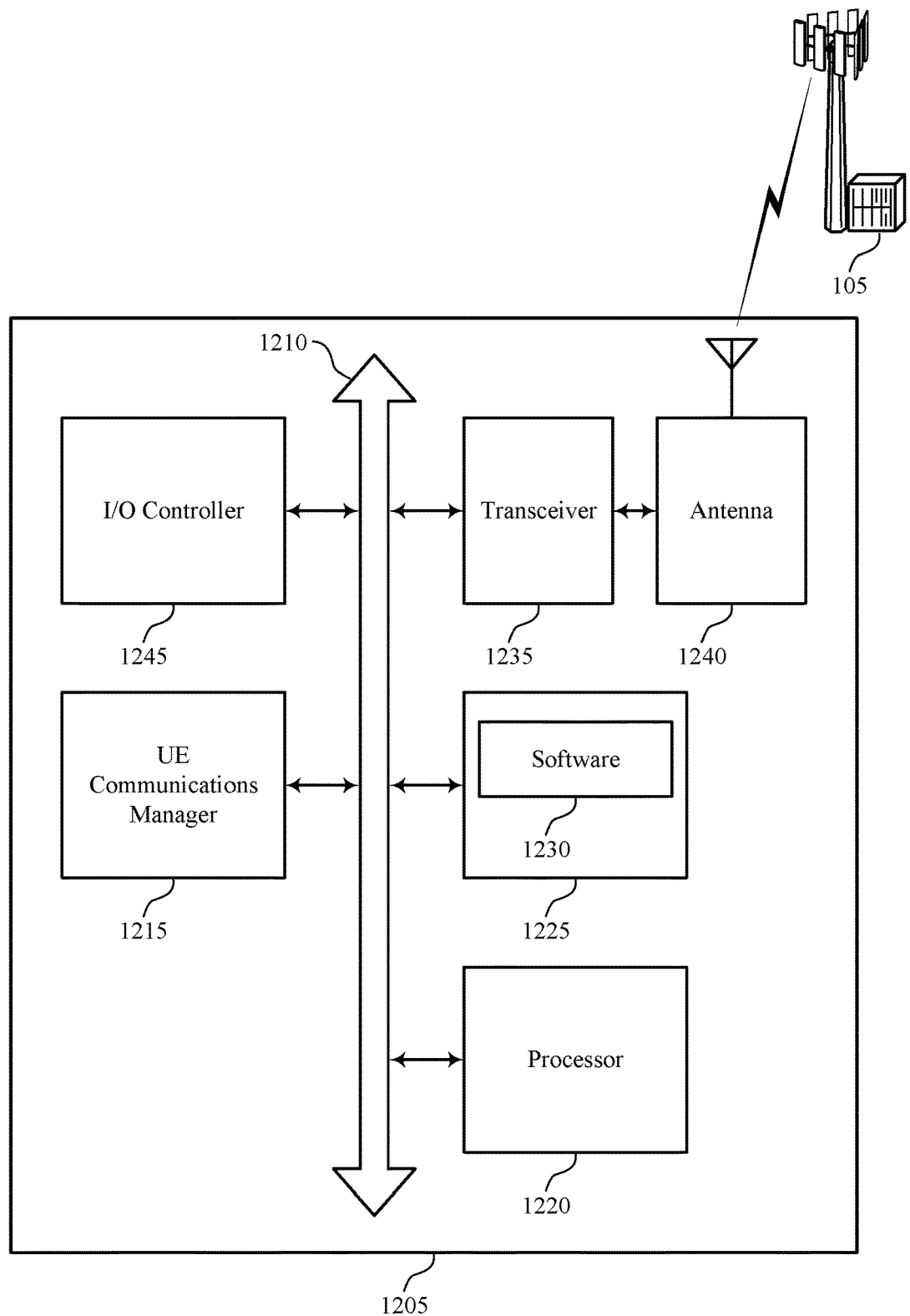
FIG. 12 illustrates a block diagram of a system including a UE that supports a beam-aware handover procedure for multi-beam access systems in accordance with aspects of the present disclosure.

FIG. 12 shows a diagram of a system 1200 including a device 1205 that supports a beam-aware handover procedure for multi-beam access systems in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting a beam-aware handover procedure for multi-beam access systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support a beam-aware handover procedure for multi-beam access systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device 1205 may include a single antenna 1240. However, in some cases the device 1205 may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
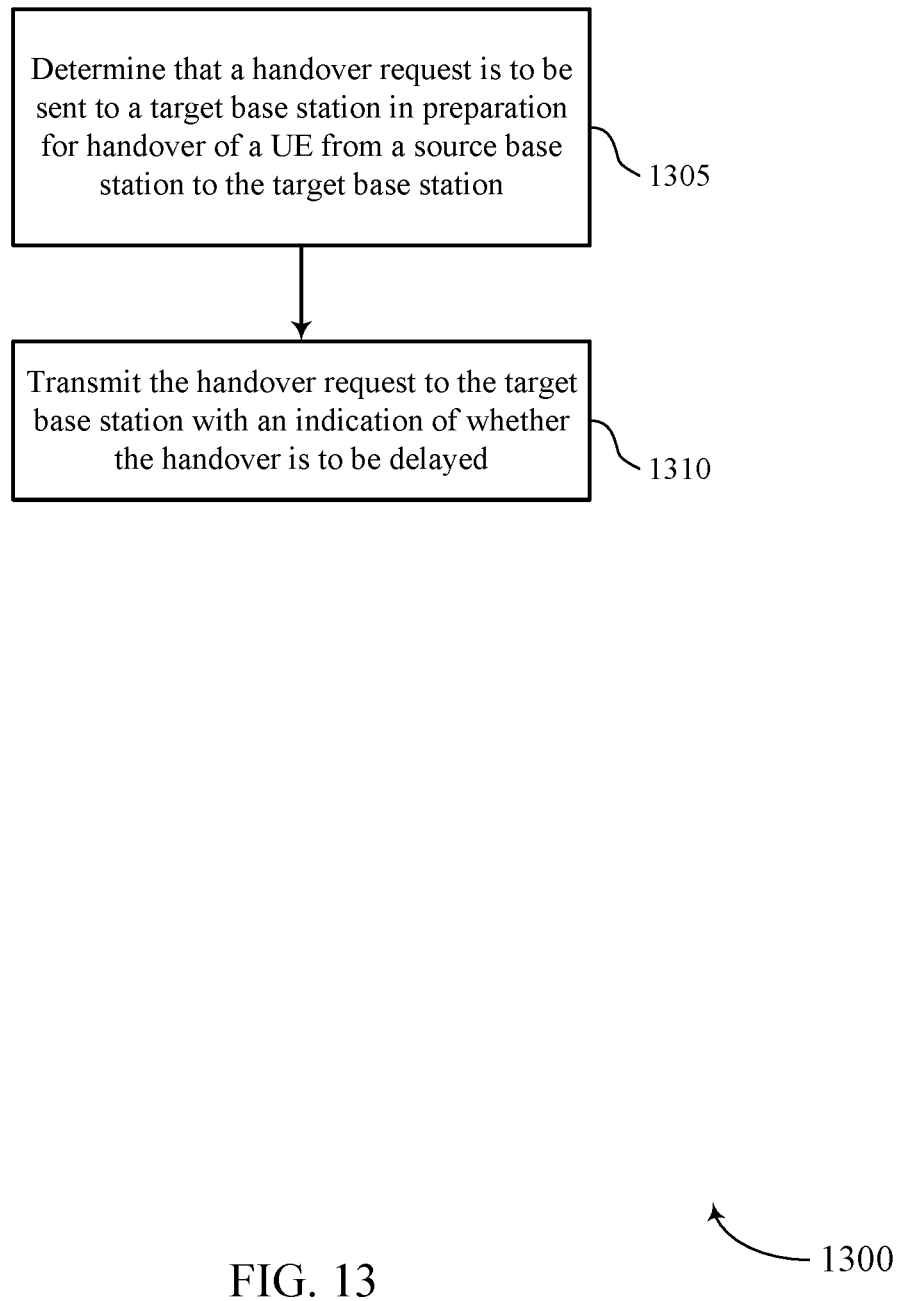
FIGS. 13 through 21 illustrate methods for a beam-aware handover procedure for multi-beam access systems in accordance with aspects of the present disclosure.

FIG. 13 shows a flowchart illustrating a method 1300 for a beam-aware handover procedure for multi-beam access systems in accordance with aspects of the present disclosure. The operations of method 1300 may be implemented by a base station 105 or its components as described herein. For example, the operations of method 1300 may be performed by a base station communications manager 515, 615, 715, and 815 as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may determine that a handover request is to be sent to a target base station in preparation for handover of a user equipment (UE) from the source base station to the target base station. The operations of block 1305 may be performed according to the methods described with reference to FIGS. 1 through 4. In certain examples, aspects of the operations of block 1305 may be performed by a handover determiner component as described with reference to FIGS. 5 through 8.

At block 1310 the base station 105 may transmit the handover request to the target base station with an indication of whether the handover is to be delayed. The operations of block 1310 may be performed according to the methods described with reference to FIGS. 1 through 4. In certain examples, aspects of the operations of block 1310 may be performed by an indication component as described with reference to FIGS. 5 through 8.

Figure 14:
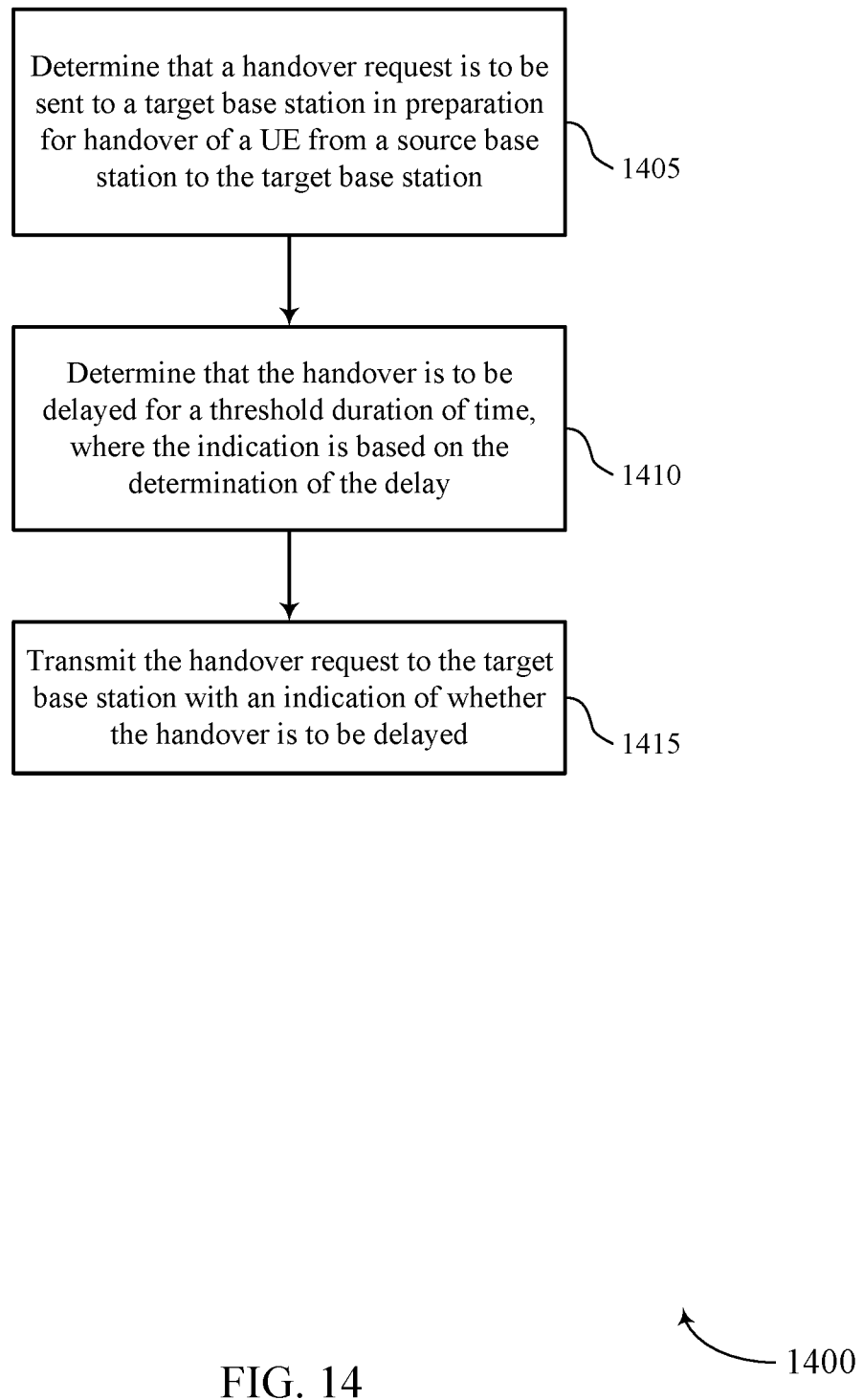

FIG. 14 shows a flowchart illustrating a method 1400 for a beam-aware handover procedure for multi-beam access systems in accordance with aspects of the present disclosure. The operations of method 1400 may be implemented by a base station 105 or its components as described herein. For example, the operations of method 1400 may be performed by a base station communications manager 515, 615, 715, and 815 as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may determine that a handover request is to be sent to a target base station in preparation for handover of a user equipment (UE) from the source base station to the target base station. The operations of block 1405 may be performed according to the methods described with reference to FIGS. 1 through 4. In certain examples, aspects of the operations of block 1405 may be performed by a handover determiner component as described with reference to FIGS. 5 through 8.

At block 1410 the base station 105 may determine that the handover is to be delayed for a threshold duration of time, wherein the indication is based at least in part on the determination of the delay. The operations of block 1410 may be performed according to the methods described with reference to FIGS. 1 through 4. In certain examples, aspects of the operations of block 1410 may be performed by an indication component as described with reference to FIGS. 5 through 8.

At block 1415 the base station 105 may transmit the handover request to the target base station with an indication of whether the handover is to be delayed. The operations of block 1415 may be performed according to the methods described with reference to FIGS. 1 through 4. In certain examples, aspects of the operations of block 1415 may be performed by an indication component as described with reference to FIGS. 5 through 8.

Figure 15:
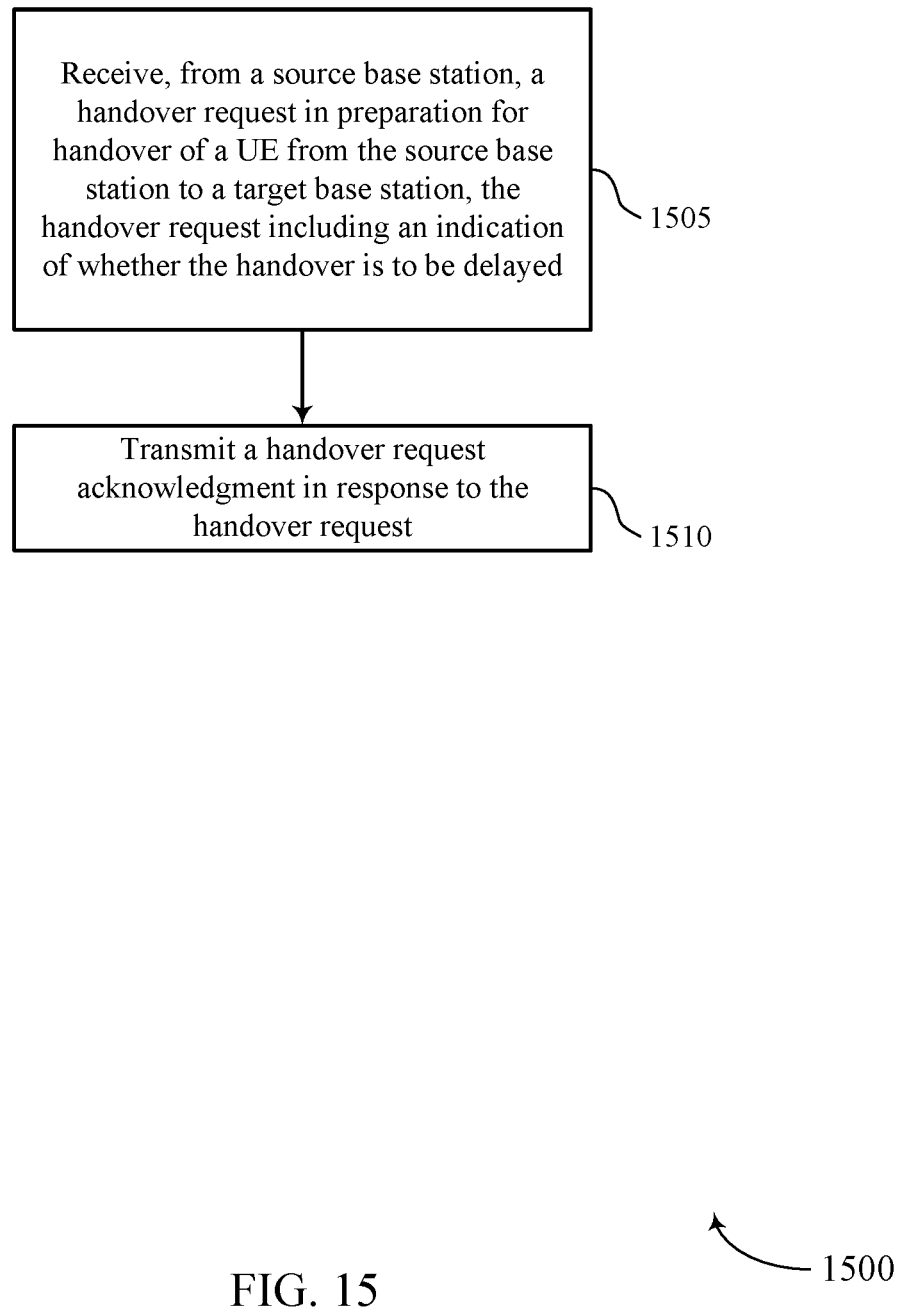

FIG. 15 shows a flowchart illustrating a method 1500 for a beam-aware handover procedure for multi-beam access systems in accordance with aspects of the present disclosure. The operations of method 1500 may be implemented by a base station 105 or its components as described herein. For example, the operations of method 1500 may be performed by a base station communications manager 515, 615, 715, and 815 as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may receive, from a source base station, a handover request in preparation for handover of a UE 115 from the source base station to the target base station, the handover request including an indication of whether the handover is to be delayed. The operations of block 1505 may be performed according to the methods described with reference to FIGS. 1 through 4. In certain examples, aspects of the operations of block 1505 may be performed by a handover request component as described with reference to FIGS. 5 through 8.

At block 1510 the base station 105 may transmit a handover request acknowledgment in response to the handover request. The operations of block 1510 may be performed according to the methods described with reference to FIGS. 1 through 4. In certain examples, aspects of the operations of block 1510 may be performed by an acknowledgment component as described with reference to FIGS. 5 through 8.

Figure 16:
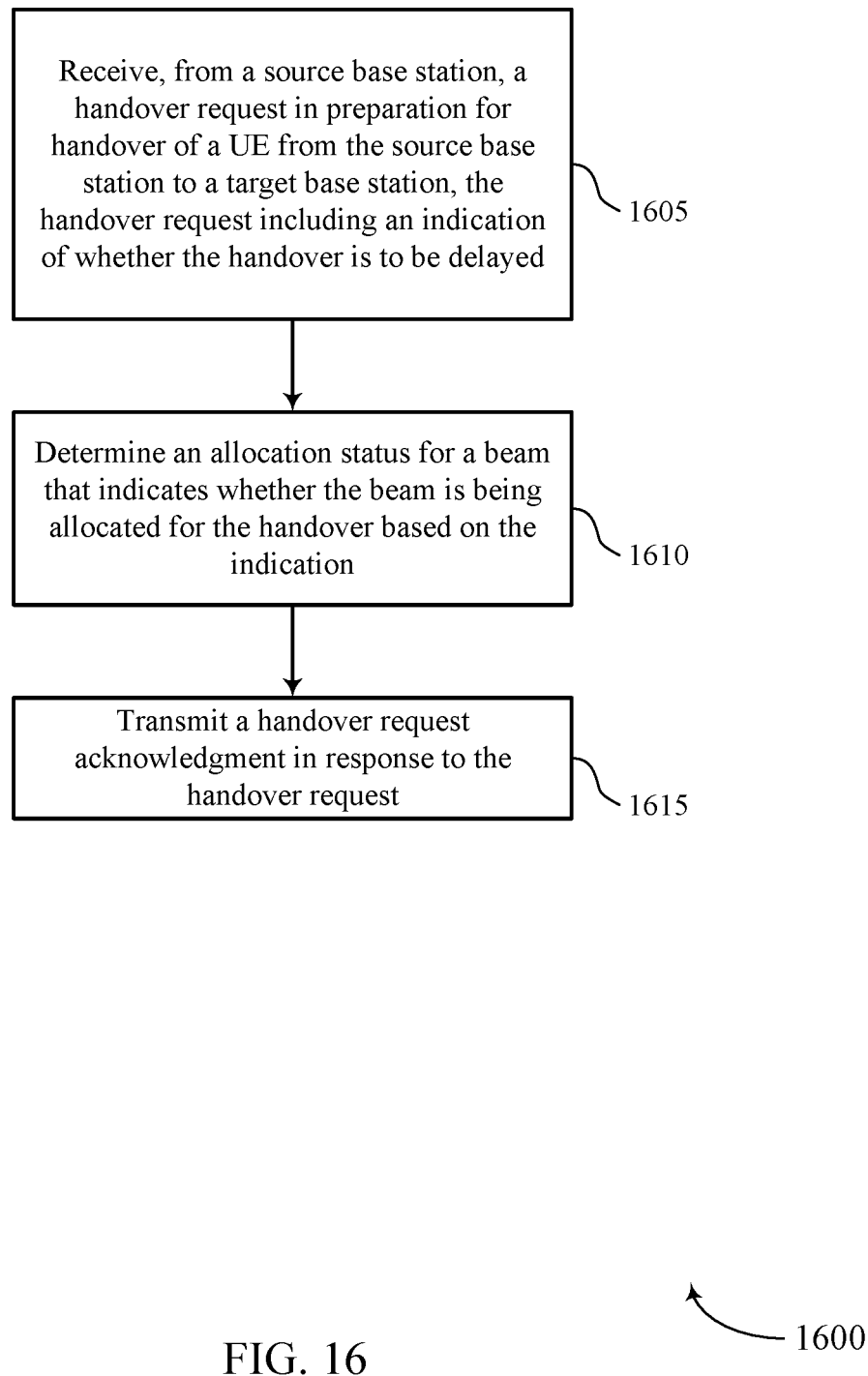

FIG. 16 shows a flowchart illustrating a method 1600 for a beam-aware handover procedure for multi-beam access systems in accordance with aspects of the present disclosure. The operations of method 1600 may be implemented by a base station 105 or its components as described herein. For example, the operations of method 1600 may be performed by a base station communications manager 515, 615, 715, and 815 as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may receive, from a source base station, a handover request in preparation for handover of a UE 115 from the source base station to the target base station, the handover request including an indication of whether the handover is to be delayed. The operations of block 1605 may be performed according to the methods described with reference to FIGS. 1 through 4. In certain examples, aspects of the operations of block 1605 may be performed by a handover request component as described with reference to FIGS. 5 through 8.

At block 1610 the base station 105 may determine an allocation status for a beam that indicates whether the beam is being allocated for the handover based at least in part on the indication. The operations of block 1610 may be performed according to the methods described with reference to FIGS. 1 through 4. In certain examples, aspects of the operations of block 1610 may be performed by an allocation status component as described with reference to FIGS. 5 through 8.

At block 1615 the base station 105 may transmit a handover request acknowledgment in response to the handover request. The operations of block 1615 may be performed according to the methods described with reference to FIGS. 1 through 4. In certain examples, aspects of the operations of block 1615 may be performed by an acknowledgment component as described with reference to FIGS. 5 through 8.

Figure 17:
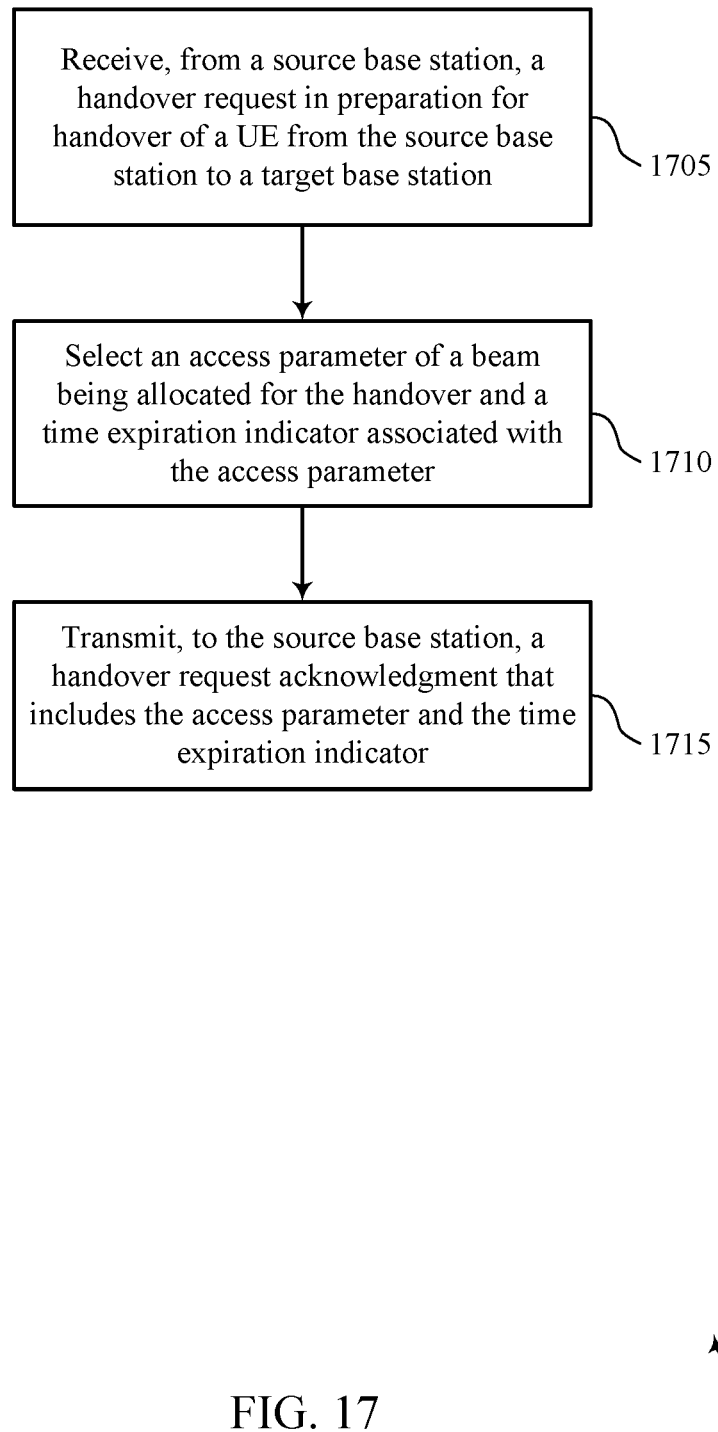

FIG. 17 shows a flowchart illustrating a method 1700 for a beam-aware handover procedure for multi-beam access systems in accordance with aspects of the present disclosure. The operations of method 1700 may be implemented by a base station 105 or its components as described herein. For example, the operations of method 1700 may be performed by a base station communications manager 515, 615, 715, and 815 as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may receive, from a source base station, a handover request in preparation for handover of a UE 115 from the source base station to the target base station. The operations of block 1705 may be performed according to the methods described with reference to FIGS. 1 through 4. In certain examples, aspects of the operations of block 1705 may be performed by a handover request component as described with reference to FIGS. 5 through 8.

At block 1710 the base station 105 may select an access parameter of a beam being allocated for the handover and a time expiration indicator associated with the access parameter. The operations of block 1710 may be performed according to the methods described with reference to FIGS. 1 through 4. In certain examples, aspects of the operations of block 1710 may be performed by a parameter selector component as described with reference to FIGS. 5 through 8.

At block 1715 the base station 105 may transmit, to the source base station, a handover request acknowledgment that includes the access parameter and the time expiration indicator. The operations of block 1715 may be performed according to the methods described with reference to FIGS. 1 through 4. In certain examples, aspects of the operations of block 1715 may be performed by an acknowledgment component as described with reference to FIGS. 5 through 8.

Figure 18:
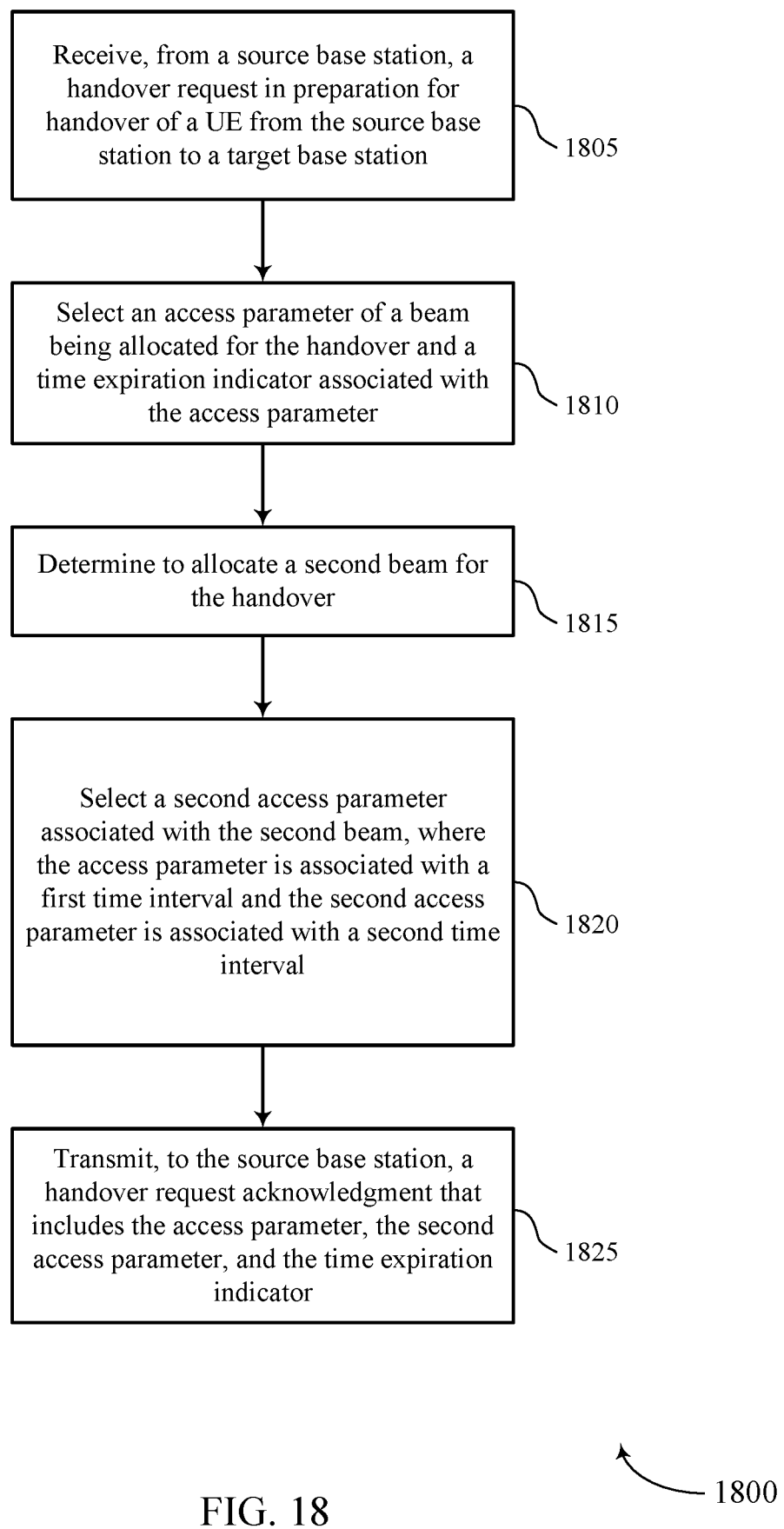

FIG. 18 shows a flowchart illustrating a method 1800 for a beam-aware handover procedure for multi-beam access systems in accordance with aspects of the present disclosure. The operations of method 1800 may be implemented by a base station 105 or its components as described herein. For example, the operations of method 1800 may be performed by a base station communications manager 515, 615, 715, and 815 as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may receive, from a source base station, a handover request in preparation for handover of a UE 115 from the source base station to the target base station. The operations of block 1805 may be performed according to the methods described with reference to FIGS. 1 through 4. In certain examples, aspects of the operations of block 1805 may be performed by a handover request component as described with reference to FIGS. 5 through 8.

At block 1810 the base station 105 may select an access parameter of a beam being allocated for the handover and a time expiration indicator associated with the access parameter. The operations of block 1810 may be performed according to the methods described with reference to FIGS. 1 through 4. In certain examples, aspects of the operations of block 1810 may be performed by a parameter selector component as described with reference to FIGS. 5 through 8.

At block 1815 the base station 105 may determine to allocate a second beam for the handover. The operations of block 1815 may be performed according to the methods described with reference to FIGS. 1 through 4. In certain examples, aspects of the operations of block 1815 may be performed by an allocation status component as described with reference to FIGS. 5 through 8.

At block 1820 the base station 105 may select a second access parameter associated with the second beam, wherein the access parameter is associated with a first time interval and the second access parameter is associated with a second time interval. The operations of block 1820 may be performed according to the methods described with reference to FIGS. 1 through 4. In certain examples, aspects of the operations of block 1820 may be performed by a parameter selector component as described with reference to FIGS. 5 through 8.

At block 1825 the base station 105 may transmit, to the source base station, a handover request acknowledgment that includes the access parameter, the second access parameter, and the time expiration indicator. The operations of block 1825 may be performed according to the methods described with reference to FIGS. 1 through 4. In certain examples, aspects of the operations of block 1825 may be performed by an acknowledgment component as described with reference to FIGS. 5 through 8.

Figure 19:
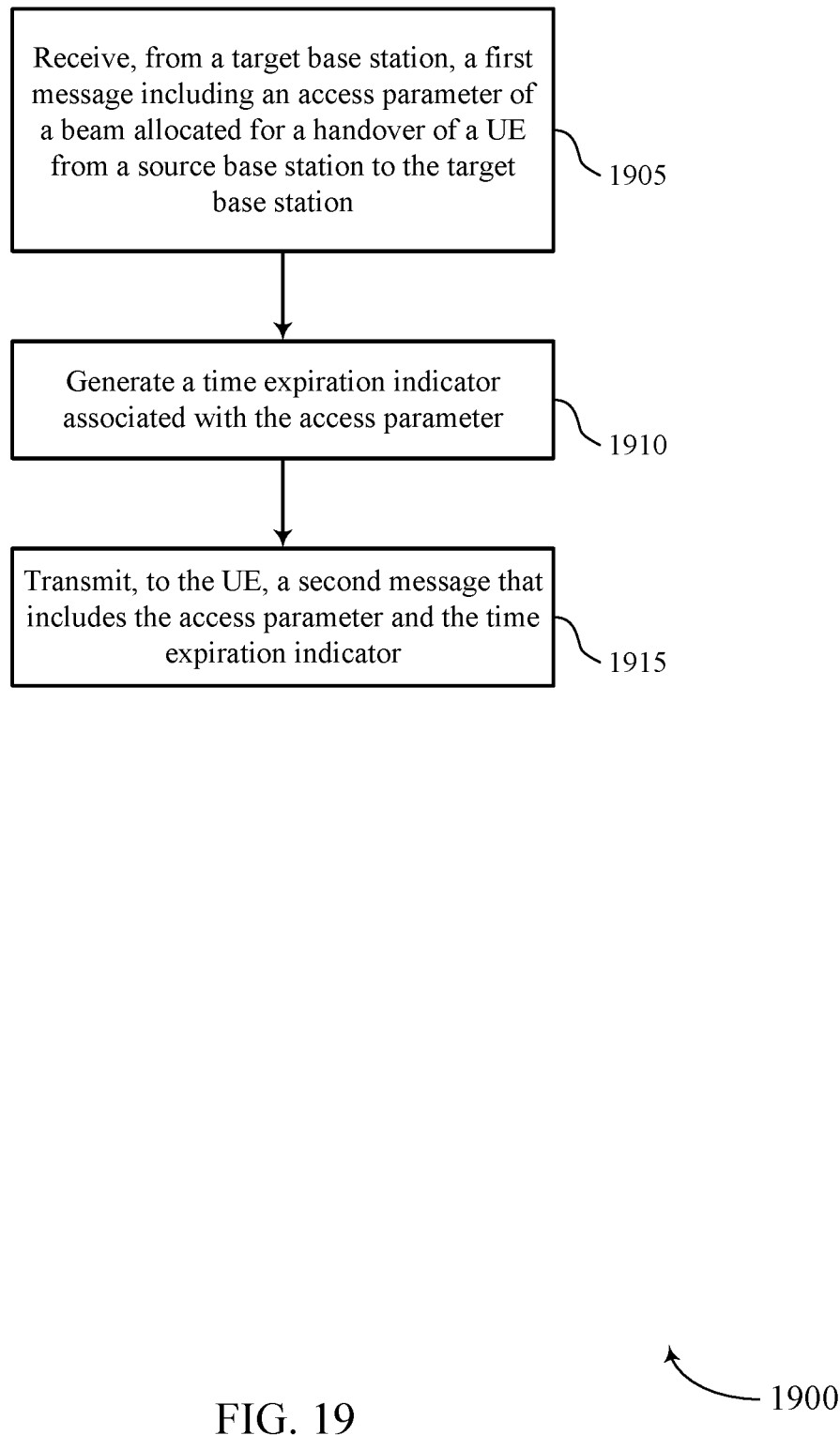

FIG. 19 shows a flowchart illustrating a method 1900 for a beam-aware handover procedure for multi-beam access systems in accordance with aspects of the present disclosure. The operations of method 1900 may be implemented by a base station 105 or its components as described herein. For example, the operations of method 1900 may be performed by a base station communications manager 515, 615, 715, and 815 as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may receive, from a target base station, a first message including an access parameter of a beam allocated for a handover of a UE 115 from the source base station to the target base station. The operations of block 1905 may be performed according to the methods described with reference to FIGS. 1 through 4. In certain examples, aspects of the operations of block 1905 may be performed by a handover request component as described with reference to FIGS. 5 through 8.

At block 1910 the base station 105 may generate a time expiration indicator associated with the access parameter. The operations of block 1910 may be performed according to the methods described with reference to FIGS. 1 through 4. In certain examples, aspects of the operations of block 1910 may be performed by a time expiration indicator component as described with reference to FIGS. 5 through 8.

At block 1915 the base station 105 may transmit, to the UE, a second message that includes the access parameter and the time expiration indicator. The operations of block 1915 may be performed according to the methods described with reference to FIGS. 1 through 4. In certain examples, aspects of the operations of block 1915 may be performed by a handover command component as described with reference to FIGS. 5 through 8.

Figure 20:
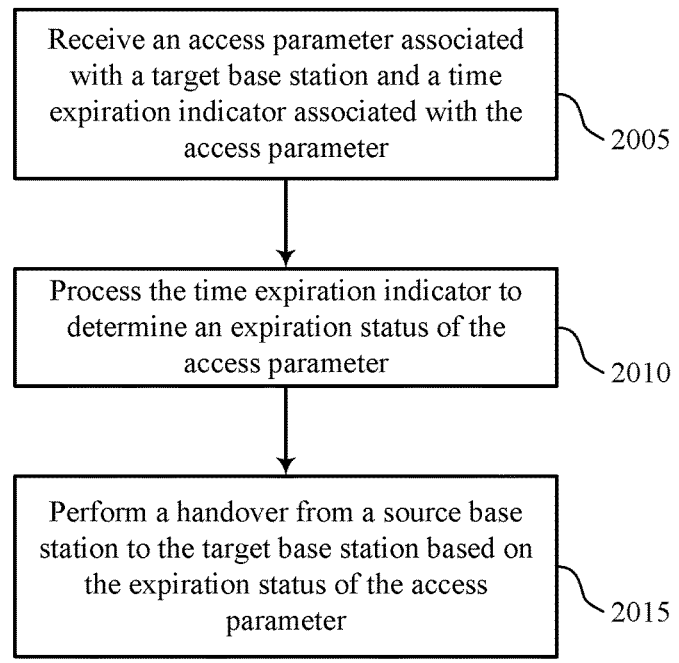

FIG. 20 shows a flowchart illustrating a method 2000 for a beam-aware handover procedure for multi-beam access systems in accordance with aspects of the present disclosure. The operations of method 2000 may be implemented by a UE 115 or its components as described herein. For example, the operations of method 2000 may be performed by a UE communications manager 915, 1015, 1115, and 1215 as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive an access parameter associated with a target base station and a time expiration indicator associated with the access parameter. The operations of block 2005 may be performed according to the methods described with reference to FIGS. 1 through 4. In certain examples, aspects of the operations of block 2005 may be performed by a parameter processor component as described with reference to FIGS. 9 through 12.

At block 2010 the UE 115 may process the time expiration indicator to determine an expiration status of the access parameter. The operations of block 2010 may be performed according to the methods described with reference to FIGS. 1 through 4. In certain examples, aspects of the operations of block 2010 may be performed by an expiration indicator processor component as described with reference to FIGS. 9 through 12.

At block 2015 the UE 115 may perform a handover from a source base station to the target base station based at least in part on the expiration status of the access parameter. The operations of block 2015 may be performed according to the methods described with reference to FIGS. 1 through 4. In certain examples, aspects of the operations of block 2015 may be performed by a handover component as described with reference to FIGS. 9 through 12.

Figure 21:
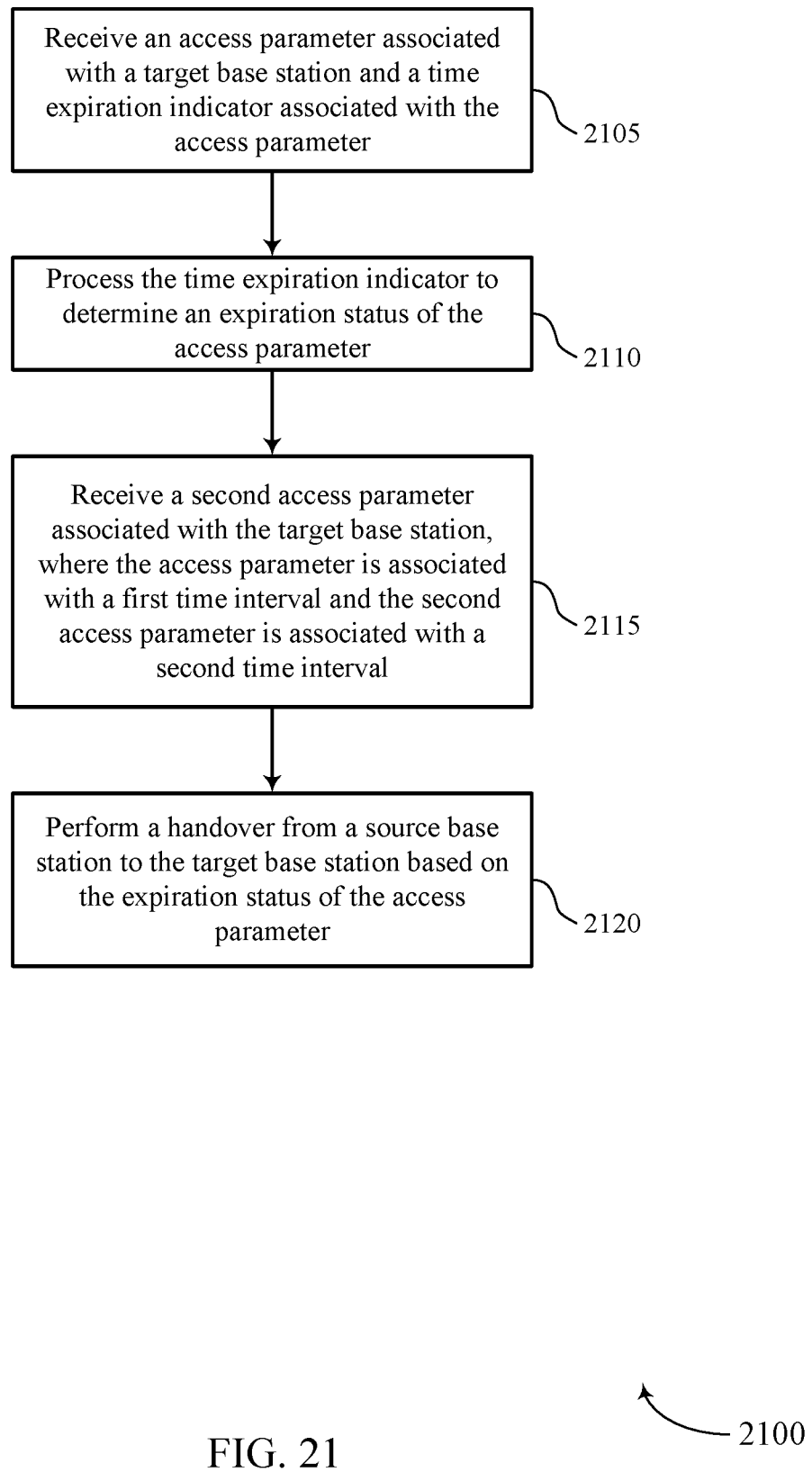

FIG. 21 shows a flowchart illustrating a method 2100 for a beam-aware handover procedure for multi-beam access systems in accordance with aspects of the present disclosure. The operations of method 2100 may be implemented by a UE 115 or its components as described herein. For example, the operations of method 2100 may be performed by a UE communications manager 915, 1015, 1115, and 1215 as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive an access parameter associated with a target base station and a time expiration indicator associated with the access parameter. The operations of block 2105 may be performed according to the methods described with reference to FIGS. 1 through 4. In certain examples, aspects of the operations of block 2105 may be performed by a parameter processor component as described with reference to FIGS. 9 through 12.

At block 2110 the UE 115 may process the time expiration indicator to determine an expiration status of the access parameter. The operations of block 2110 may be performed according to the methods described with reference to FIGS. 1 through 4. In certain examples, aspects of the operations of block 2110 may be performed by an expiration indicator processor component as described with reference to FIGS. 9 through 12.

At block 2115 the UE 115 may receive a second access parameter associated with the target base station, wherein the access parameter is associated with a first time interval and the second access parameter is associated with a second time interval. The operations of block 2115 may be performed according to the methods described with reference to FIGS. 1 through 4. In certain examples, aspects of the operations of block 2115 may be performed by an expiration indicator processor component as described with reference to FIGS. 9 through 12.

At block 2120 the UE 115 may perform a handover from a source base station to the target base station based at least in part on the expiration status of the access parameter. The operations of block 2120 may be performed according to the methods described with reference to FIGS. 1 through 4. In certain examples, aspects of the operations of block 2120 may be performed by a handover component as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a source base station, comprising:
   determining that a handover request is to be sent to a target base station by the source base station in preparation for handover of a user equipment (UE) from the source base station to the target base station;
   transmitting the handover request to the target base station with an indication that the handover is to be delayed for a first duration of time, the handover request comprising one or more access parameters associated with the handover; and
   determining to initiate handover of the UE from the source base station to the target base station based at least in part on the first duration of time being less than a threshold duration of time, the threshold duration of time corresponding to an expiration time for the one or more access parameters associated with the handover.

2. The method of claim 1, wherein the indication that handover is to be delayed is based at least in part on the determination to initiate handover.

3. The method of claim 1, further comprising:
   receiving, from the UE, a measurement report that includes the one or more access parameters comprising one or more beam identifiers of beams associated with the target base station, wherein the handover request includes the one or more beam identifiers.

4. The method of claim 3, wherein:
   the measurement report includes beam measurements corresponding to the one or more beam identifiers.

5. The method of claim 1, wherein:
   the indication is a binary flag that indicates the handover is one of a delayed handover.

6. The method of claim 1, further comprising:
   estimating an amount of time to delay the handover, wherein the estimate of the amount of time is included in the indication.

7. The method of claim 1, further comprising:
   transmitting a measurement configuration that instructs the UE to measure a plurality of different beams.

8. The method of claim 1, further comprising:
receiving, from the target base station, a handover request acknowledgement that includes an access parameter; and
transmitting, to the UE, a handover command that includes the access parameter to initiate execution of the handover of the UE from the source base station to the target base station.

9. The method of claim 8, wherein:
transmitting the handover command further comprises delaying transmission of the handover command.

10. The method of claim 8, wherein:
the handover request acknowledgement comprises a time stamp associated with a time when the access parameter expires.

11. The method of claim 8, wherein:
the handover request acknowledgement comprises a second access parameter, wherein the access parameter is associated with a first time interval and the second access parameter is associated with a second time interval.

12. A method for wireless communication by a target base station, comprising:
receiving, from a source base station, a handover request in preparation for handover of a user equipment (UE) from the source base station to the target base station, the handover request comprising one or more access parameters associated with the handover, and the handover request including an indication that the handover is to be delayed for a first duration of time that is less than a threshold duration of time corresponding to an expiration time for the one or more access parameters associated with the handover; and
transmitting a handover request acknowledgment in response to the handover request.

13. The method of claim 12, further comprising:
determining an allocation status for a beam that indicates whether the beam is being allocated for the handover based at least in part on the indication.

14. The method of claim 13, wherein determining the allocation status comprises:
determining to allocate the beam for the handover, wherein the handover request acknowledgment comprises a beam identifier of the beam.

15. The method of claim 13, wherein determining the allocation status comprises:
determining to allocate the beam for the handover; and
selecting an access parameter associated with the beam, wherein the handover request acknowledgment comprises the access parameter.

16. The method of claim 15, further comprising:
generating a time stamp associated with the expiration time of the access parameter, wherein the handover request acknowledgement comprises the time stamp.

17. The method of claim 15, wherein determining the allocation status comprises:
determining to allocate a second beam for the handover; and
selecting a second access parameter associated with the second beam, wherein the access parameter is associated with a first time interval and the second access parameter is associated with a second time interval, and wherein the handover request acknowledgement comprises the second access parameter.

18. The method of claim 12, wherein:
the indication is a binary flag that indicates the handover is one of a non-delayed handover and a delayed handover.

19. The method of claim 12, wherein:
the handover request comprises one or more beam identifiers of beams associated with the target base station.

20. The method of claim 19, wherein:
the handover request comprises beam measurements corresponding to the one or more beam identifiers.

21. The method of claim 20, wherein:
the handover request acknowledgment comprises the one or more beam identifiers.

22. A method for wireless communication by a target base station, comprising:
receiving, from a source base station, a handover request in preparation for handover of a user equipment (UE) from the source base station to the target base station, the handover request comprising one or more access parameters associated with the handover and an indication that the handover is to be delayed for a first duration of time that is less than a threshold duration of time, the threshold duration of time corresponding to an expiration time for the one or more access parameters associated with the handover;
selecting an access parameter of a beam being allocated for the handover and a time expiration indicator associated with the access parameter, the access parameter based at least in part on the threshold duration of time; and
transmitting, to the source base station, a handover request acknowledgment that includes the access parameter and the time expiration indicator.

23. The method of claim 22, further comprising:
setting the expiration time for the access parameter based at least in part on a time indicated in a time stamp.

24. The method of claim 22, wherein:
the time expiration indicator is a maximum attempt number, indicating a maximum number of attempts to be made by the UE for handover using the access parameter.

25. The method of claim 22, further comprising:
determining to allocate a second beam for the handover; and
selecting a second access parameter associated with the second beam, wherein the access parameter is associated with a first time interval and the second access parameter is associated with a second time interval, and wherein the handover request acknowledgement comprises the second access parameter.

26. The method of claim 25, wherein:
the second access parameter is a dedicated preamble for contention-free access.

27. The method of claim 22, wherein:
the one or more access parameters comprises one or more beam identifiers of beams associated with the target base station.

28. The method of claim 27, wherein:
the handover request comprises beam measurements corresponding to the one or more beam identifiers.

29. The method of claim 28, wherein:
the handover request acknowledgment comprises the one or more beam identifiers.

30. A method for wireless communication by a source base station, comprising:
receiving, from a target base station, a first message comprising one or more access parameters including an access parameter of a beam allocated for a handover of a user equipment (UE) from the source base station to the target base station, wherein the handover is to be delayed for a first duration of time that is less than a threshold duration of time, the threshold duration of time corresponding to an expiration time for the one or more access parameters associated with the handover;

generating a time expiration indicator associated with the access parameter; and transmitting, to the UE, a second message that includes the access parameter and the time expiration indicator based at least in part on the threshold duration of time.

31. The method of claim 30, wherein:
the time expiration indicator indicates an age of the access parameter.

32. The method of claim 30, wherein:
the time expiration indicator is a binary flag that indicates whether the access parameter is outdated.

33. The method of claim 30, wherein:
the time expiration indicator is a time value that indicates a time of receipt of the access parameter by the source base station from the target base station.

34. A method for wireless communication by a user equipment (UE), comprising:
receiving one or more access parameters comprising an access parameter of a beam associated with a target base station and a time expiration indicator associated with the access parameter;
determining that a handover of the UE from a source base station to the target base station is delayed for a first duration of time that is less than a threshold duration of time, wherein the threshold duration of time corresponds to an expiration time for the one or more access parameters associated with the handover;
determining an expiration status of the access parameter based at least in part on a comparison of the time expiration indicator to the first duration of time; and
performing a handover from the source base station to the target base station based at least in part on the expiration status of the access parameter.

35. The method of claim 34, wherein:
the time expiration indicator is a time stamp.

36. The method of claim 35, further comprising:
deriving a time of expiration of the access parameter from the time stamp.

37. The method of claim 34, wherein:
the time expiration indicator is a maximum attempt number, indicating a maximum number of attempts to be made by the UE for handover using the access parameter.

38. The method of claim 34, wherein the expiration status indicates that the access parameter is expired, and wherein performing the handover comprises:
obtaining a second access parameter from the target base station; and
performing an access procedure using the second access parameter to establish a connection with the target base station.

39. The method of claim 38, wherein:
the second access parameter is a dedicated preamble for contention-free access.

40. The method of claim 39, further comprising:
identifying a transmission beam to use based on receipt of a downlink reference signal; and
transmitting a random access channel (RACH) message to the target base station using the transmission beam and the dedicated preamble.

41. The method of claim 34, wherein the expiration status indicates that the access parameter is not expired, and wherein performing the handover comprises performing an access procedure using the access parameter to establish a connection with the target base station.

42. The method of claim 34, further comprising:
receiving a second access parameter associated with the target base station, wherein the access parameter is associated with a first time interval and the second access parameter is associated with a second time interval.

43. The method of claim 42, wherein the expiration status indicates that the access parameter is expired, and wherein performing the handover comprises performing an access procedure using the second access parameter to establish a connection with the target base station.

44. The method of claim 43, wherein:
the time expiration indicator indicates an age of the access parameter.

45. The method of claim 43, wherein:
the time expiration indicator is a binary flag that indicates whether the access parameter is outdated.

46. The method of claim 43, wherein:
the time expiration indicator is a time value that indicates a time of receipt of the access parameter by the source base station from the target base station.

47. An apparatus for wireless communication by a source base station, in a system comprising:
a processor;
memory coupled with the processor; and
instructions stored in the memory and operable, when executed by the processor, to cause the apparatus to:
determine that a handover request is to be sent to a target base station by the source base station in preparation for handover of a user equipment (UE) from the source base station to the target base station;
transmit the handover request to the target base station with an indication that the handover is to be delayed for a first duration of time, the handover request comprising one or more access parameters associated with the handover; and
determining to initiate handover of the UE from the source base station to the target base station based at least in part on the first duration of time being less than a threshold duration of time, the threshold duration of time corresponding to an expiration time for the one or more access parameters associated with the handover.

48. The apparatus of claim 47, wherein the indication that the handover is to be delayed is based at least in part on the determination to initiate handover.

49. The apparatus of claim 47, wherein the instructions are further operable to:
receive, from the UE, a measurement report that includes the one or more access parameters comprising one or more beam identifiers of beams associated with the target base station, wherein the handover request includes the one or more beam identifiers.

50. The apparatus of claim 47, wherein the instructions are further operable to:
estimate an amount of time to delay the handover, wherein the estimate of the amount of time is included in the indication.

51. The apparatus of claim 47, wherein the instructions are further operable to:
transmit a measurement configuration that instructs the UE to measure a plurality of different beams.

52. The apparatus of claim 47, wherein the instructions are further operable to:
- receive, from the target base station, a handover request acknowledgement that includes an access parameter; and
- transmit, to the UE, a handover command that includes the access parameter to initiate execution of the handover of the UE from the source base station to the target base station.

53. An apparatus for wireless communication by a target base station, in a system comprising:
- a processor;
- memory coupled with the processor; and
- instructions stored in the memory and operable, when executed by the processor, to cause the apparatus to:
  - receive, from a source base station, a handover request in preparation for handover of a user equipment (UE) from the source base station to the target base station, the handover request comprising one or more access parameters associated with the handover, and the handover request including an indication that the handover is to be delayed for a first duration of time that is less than a threshold duration of time corresponding to an expiration time for the one or more access parameters associated with the handover; and
  - transmit a handover request acknowledgment in response to the handover request.

54. The apparatus of claim 53, wherein the instructions are further operable to:
- determine an allocation status for a beam that indicates whether the beam is being allocated for the handover based at least in part on the indication.

55. An apparatus for wireless communication by a target base station, in a system comprising:
- a processor;
- memory coupled with the processor; and
- instructions stored in the memory and operable, when executed by the processor, to cause the apparatus to:
  - receive, from a source base station, a handover request in preparation for handover of a user equipment (UE) from the source base station to the target base station, the handover request comprising one or more access parameters associated with the handover and an indication that the handover is to be delayed for a first duration of time that is less than a threshold duration of time, the threshold duration of time corresponding to an expiration time for the one or more access parameters associated with the handover;
  - select an access parameter of a beam being allocated for the handover and a time expiration indicator associated with the access parameter, the access parameter based at least in part on the threshold duration of time; and
  - transmit, to the source base station, a handover request acknowledgment that includes the access parameter and the time expiration indicator.

56. The apparatus of claim 55, wherein the instructions are further operable to:
- set the expiration time for the access parameter based at least in part on a time indicated in a time stamp.

57. The apparatus of claim 55, wherein the instructions are further operable to:
- determine to allocate a second beam for the handover; and
- select a second access parameter associated with the second beam, wherein the access parameter is associated with a first time interval and the second access parameter is associated with a second time interval, and wherein the handover request acknowledgement comprises the second access parameter.

58. An apparatus for wireless communication by a source base station, in a system comprising:
- a processor;
- memory coupled with the processor; and
- instructions stored in the memory and operable, when executed by the processor, to cause the apparatus to:
  - receive, from a target base station, a first message comprising one or more access parameters including an access parameter of a beam allocated for a handover of a user equipment (UE) from the source base station to the target base station, wherein the handover is to be delayed for a first duration of time that is less than a threshold duration of time, the threshold duration of time corresponding to an expiration time for the one or more access parameters associated with the handover;
  - generate a time expiration indicator associated with the access parameter; and
  - transmit, to the UE, a second message that includes the access parameter and the time expiration indicator based at least in part on the threshold duration of time.

59. An apparatus for wireless communication by a user equipment (UE), in a system comprising:
- a processor;
- memory coupled with the processor; and
- instructions stored in the memory and operable, when executed by the processor, to cause the apparatus to:
  - receive one or more access parameters comprising an access parameter of a beam associated with a target base station and a time expiration indicator associated with the access parameter;
  - determine that a handover of the UE from a source base station to the target base station is delayed for a first duration of time that is less than a threshold duration of time, wherein the threshold duration of time is corresponds to an expiration time for the one or more access parameters associated with the handover;
  - determine an expiration status of the access parameter based at least in part on a comparison of the time expiration indicator to the first duration of time; and
  - perform a handover from the source base station to the target base station based at least in part on the expiration status of the access parameter.

60. The apparatus of claim 59, wherein the instructions are further operable to:
- receive a second access parameter associated with the target base station, wherein the access parameter is associated with a first time interval and the second access parameter is associated with a second time interval.

* * * * *